United States Patent [19]
Rasmussen

[11] 4,229,394
[45] * Oct. 21, 1980

[54] MULTI-LAYER PRODUCTS

[76] Inventor: Ole-Bendt Rasmussen, Topstykket 7, 3460 Birkerod, Denmark

[*] Notice: The portion of the term of this patent subsequent to Nov. 14, 1995, has been disclaimed.

[21] Appl. No.: 926,244

[22] Filed: Jul. 20, 1978

Related U.S. Application Data

[60] Division of Ser. No. 607,695, Aug. 25, 1975, Pat. No. 4,125,581, which is a continuation of Ser. No. 421,270, Dec. 3, 1973, abandoned, which is a continuation of Ser. No. 75,229, Sep. 24, 1970, abandoned, which is a continuation-in-part of Ser. No. 871,688, Nov. 19, 1969, abandoned, which is a continuation of Ser. No. 694,433, Dec. 29, 1967, abandoned, and Ser. No. 694,660, Dec. 29, 1967, Pat. No. 3,547,761, and Ser. No. 751,205, Aug. 8, 1968, abandoned, and Ser. No. 757,237, Aug. 8, 1968, abandoned.

[30] Foreign Application Priority Data

Dec. 30, 1966 [GB] United Kingdom .............. 58429/66
Aug. 9, 1967 [GB] United Kingdom .............. 36531/67

[51] Int. Cl.² ............................................. B32B 31/30
[52] U.S. Cl. ................................... 264/46.1; 156/196; 156/244.18; 156/244.19; 264/49; 264/147; 264/171; 264/310
[58] Field of Search ................. 264/171, 103, 147, 49, 264/211, 141, 310, 312, 349, 46.1, 45.9, DIG. 47, 210.1; 156/196, 244.18, 344, 244.19

[56] References Cited

U.S. PATENT DOCUMENTS

| | | |
|---|---|---|
| 3,132,194 | 5/1964 | Edmonds, Jr. et al. .............. 264/49 |
| 3,321,804 | 5/1967 | Breidt, Jr. et al. ............... 425/133.5 |
| 3,403,203 | 9/1968 | Schirmer ..................... 264/DIG. 47 |
| 3,565,985 | 2/1971 | Schrenk et al. ..................... 264/171 |

*Primary Examiner*—Jeffery R. Thurlow
*Attorney, Agent, or Firm*—William J. Daniel

[57] ABSTRACT

Fibrous products, including single fibers, yarn and fibrous webs, of improved fineness are produced from extruded sheet material extruding in the form of a sheet-like, multi-layer composite stream a plurality of extrudable materials, at least one of which is a synthetic thermoplastic fiber-forming polymer and another of which is expandable or swellable in nature, which layers extend generally parallel to the faces of the stream, with each such layer containing either a fiber-forming polymer or an expandable or swellable extrudable material with the different layers being interspersed in the composite stream; solidifying this composite stream into a multi-layer sheet, not earlier than during such solidification subjecting the multi-layer sheet to a swelling or expanding treatment to aid in its mechanical disruption, and then mechanically disrupting the swollen or expanded sheet to produce a fibrous product of increased fineness. Alternatively, the other extrudable material can be incompatible with the polymer so as to separate therefrom during mechanical disruption. Instead of solidifying the extruded stream while intact, the stream can be divided during extrusion along spaced generally parallel planes extending through the stream at an angle to its faces and solidified in this divided state to form separate strips each containing a section of the multi-layer composite stream. These separate strips are then treated as indicated to at least partially remove the removable material and at least partially separate the polymeric layers therein. Alternatively, the stream can be divided and re-united before solidification.

14 Claims, 29 Drawing Figures

MULTI-LAYER PRODUCTS

This application is a division of application Ser. No. 607,695, filed Aug. 25, 1975, now U.S. Pat. No. 4,125,581, which in turn is a continuation of application Ser. No. 421,270, filed Dec. 3, 1973, and now abandoned, which in turn is a continuation of application Ser. No. 75,229, filed Sept. 24, 1970, and now abandoned, which is a composite continuation-in-part of application Ser. No. 871,688, filed Nov. 19, 1969, and now abandoned, which is in turn a continuation application of application Ser. No. 694,433, filed Dec. 29, 1967 and now abandoned; application Ser. No. 694,660, filed Dec. 29, 1967, now U.S. Pat. No. 3,547,761, issued Dec. 15, 1970; application Ser. No. 751,205, filed Aug. 8, 1968, and now abandoned, of which continuation-in-part application Ser. No. 147,496 was filed on May 27, 1971 and is now U.S. Pat. No. 3,778,333, issued Dec. 11, 1973; and application Ser. No. 757,237 filed Aug. 8, 1968, and now abandoned.

BACKGROUND OF THE INVENTION

The production of fibres from films by splitting has hitherto in practice been confined to the use of polypropylene and high density polyethylene films which possess high splittability in an oriented state. Furthermore, the fibre fineness has been limited by the thickness of the films and because of the complications encountered in the film-making process it has not yet been found practical to use very thin sheets generally more desirable.

Furthermore, the fibres produced by the prior art processes have shown a rather low abrasion resistance and resilience, due to the high splittability of the said polymers and to the fact that fissures were introduced which have a tendency to propagate.

Although methods are known for fibrillating films and filaments made from polymers which are more suitable for textile products, e.g. polyamides, and polyethyleneterephthalate and for obtaining fibres which are finer than the thickness of the oriented films from which they have been derived, these methods have not been utilized to any significant extent due to various complications.

The present invention comprises various aspects of a new technique for making split-fibres and the like starting with a sheet structure which is built up from many thin layers of different polymers arranged in interspersed relationship and generally parallel to the face of said sheet structure. This multi-layer structure may be manipulated in different ways before solidification but in any case the solid product still exhibits a distinct multi-layer arrangement which is utilized for forming thin structures by a rubbing action or the like by which the connections between said layers are cleaved. Thus, it becomes possible to form by an economical and simple process split-fibres even from generally unsplittable polymers and to form split-fibres which are much thinner than the film or sheet from which they have been derived.

The invention further comprises a method for forming by oc-extrusion a multi-layer sheet or film which is particularly suitable in connection with the subsequent cleaving step but which also can be used independently for the production of laminates.

A still further aspect of the invention comprises the production of bi- or multi-component fibres.

SUMMARY OF THE INVENTION

The first aspect of the present invention relates to a process of producing multi-layer thermoplastic products.

The combination of reinforcing material and filling material in a sheet is usually made by simple compounding before the formation of the sheet, or by using the reinforcement material in the form of a woven, knitted or non-woven fabric to which the filling material is adhered, or by laminating the filler to one or several films of the reinforcement material. In the first case the reinforcement material is substantially weakened at least with respect to creep resistance, whereas the production of the second kind of sheet material is relatively complicated and expensive, and the third kind of sheet material generally has low abrasion resistance or a tendency to delamination on bending. The basic object of the present invention is to overcome the above-mentioned drawbacks by use of two extrudable thermoplastic materials in a new, suitable laminated arrangement which easily can be produced by extrusion.

Thus according to the invention there is provided a process of producing multi-layer thermoplastic product comprising:

Forming plural distinct streams of two fluid extrudable materials, at least one of said materials being a thermoplastic polymer and the other a material adapted to maintain the polymer streams separate and distinct;

introducing said plural distinct streams of said two materials in interspersed juxtaposed relation into an annular zone, said zone being defined by inner and outer walls;

while advancing said streams in said zone, rotating at least one of said walls relative to the other to spread or smear the streams circumferentially into a plurality of distinct layers of substantially reduced thickness extending substantially parallel to the surfaces of said walls, and solidifying the multi-layer product thus formed.

In the extruded sheet material according to my invention the two extrudable materials are present in the sheet material in the form of interspersed intimately adhering thin lamellae, the former having an overall thickness between 0.1 and 10 microns and traversing the flat dimension of the sheet at an overall angle of less than 2° to the surfaces of the sheet. The said range of thickness is actually about the marginal range between dimensions which with regard to dispersions are considered to be colloidal, and dimensions which in the same respect are considered to be macrodimensions. It has been found that a laminate of such materials tends to behave more and more as an undisruptable whole when the thickness of the layers of the former material approaches or reaches colloidal dimensions. If, on the other hand, the thickness of one of the set of layers actually takes on colloidal dimensions, surface irregularities will play an essential role to weaken the material. The indicated range of thickness has been found generally suitable, and more particularly, the range between 0.5 and 5 microns is generally preferable. The use of the colloidal or almost colloidal thickness of the layers has a further advantage in that local failures in the raw materials as well as scratches in the surface made by abrasion, have very little influence on the tensile strength of the sheet. It would be very difficult and uneconomical to produce, handle and laminate film material of such fine thickness in conventional manner in order to make laminates of the thickness which is generally required for packaging and other purposes. A preferred embodiment of the process of the invention comprises feeding fluid first extrudable, polymeric material to first orifices in a row of orifices in an extruding device, feeding a fluid second extrudable material to second orifices in the row, extruding the fluid materials through the orifices into a collecting chamber that extends along the length of the row and has an outlet slot extending along the length of the row, and while extruding said fluid materials through said collecting chamber and slot, subjecting the extruded sheet to a transverse smearing action.

If the thickness of the lamellae is not sufficiently reduced during the passage through the extruding device, the sheet material must be drawn subsequently in one or several operations.

The transverse smearing action, by which the lamellae of the material are brought down to at least a relatively fine thickness, if not fully brought down to the final thickness of between 0.1 and 10 microns, can be established by movement of the chamber and the row of orifices relative to and along one another. In this case the collecting chamber should preferably narrow down immediately after the orifices preferably in a neck, i.e. very rapidly, in order to enable a sufficient shear to be produced between the nozzle parts in the row and the walls of the collecting chamber. The extruded lamellae are hereby deflected from the forward direction and will continue their flow in a "broadside" manner. The "broadside" flow through the collecting chamber and the slot at its end will make the lamellae drag in the direction of extrusion, i.e. the sides of the lamellae will be dragged in relation to their central portion.

An alternative method of establishing the transverse smearing action is to move one side of the collecting chamber relative to and along the other. The sides of the lamellae will thereby be dragged in relation to each other. In this case it is less important for the collecting chamber to narrow down, and there may even be a long chamber zone, where no transverse shear occurs, between the row of orifices and the moved parts of the collecting chamber, since the nozzle parts need not participate in the smearing action in this case. However, it is also possible to combine the two methods.

The orifices for extrusion of a large number of lamellae side by side into the collecting chamber are preferably closely spaced, elongated slots forming an angle with the row in which they are arranged.

It seems mechanically impossible to make the spacing between the extrusion orifices of the row closer than about 1 mm, and generally a spacing of 2–3 mm is preferable for constructional reasons. If the extrusion velocities of the two polymeric materials are equal, the original thickness of the lamellae will equal the distance between the slots; however it is easy to obtain the desired small thickness of the lamellae by the dragging and shearing action described.

I use the term lamellae to signify any body in which one dimension is very much greater than one at least of its other dimensions, and in my final product at least one dimension is very much less than the other two dimensions.

The conformation of the lamellae will depend upon the manner of forming the sheet material. If there is established a movement of the collecting chamber in its entirety and the row relative to and along each other, all the lamellae of the first polymeric material, because of the kind of drag described above, will become U-shaped, with the point of the U leading in the direction of extrusion. The central portion of the U purposely may be missing as will be explained in a following paragraph.

If one side of the collecting chamber is moved relative to the other as the lamellae are passing through it this will drag the sides of the latter with the effect that the lamellae of first polymeric material will be brought to lie substantially parallel to the plane of the sheet material. I call the shape of the lamellae, in the direction transverse to the length dimension of the lamellae, a flattened S in this instance. It is also possible to chop the lamellae into shorter lengths, before the final shear or dragging action in the extrusion device, and the discontinuous lamellae hereby will form rows of U or S profile in the extruded sheet material.

The shape of the lamellae will depend at least in part upon the relationship between the viscosities of the particular polymeric materials that are used as well as their deviatons from Newtonian behaviour, and upon the movement and shape of the devices establishing drag and shear.

Generally the materials should have rather similar viscosities, but the use of different viscosities is facilitated by making a sudden reduction of the thickness of the extrusion nozzle at the orifices, so that a substantial pressure drop is produced within the orifice.

It is sometimes desirable to draw the lamellae in two steps while they remain fluid. This may be achieved by providing the collecting chamber with a large number of dividing walls after the neck so as to form in the collecting chamber a row of channels parallel to the row of extrusion orifices, and feeding the fluid lamellae material emerging from the channels into a second collecting chamber that also extends along the row. This second chamber preferably has a similar internal profile to the first and preferably also includes a neck leading to its slot. This chamber as well as the row of extrusion orifices by which the lamellae are originally formed are preferably stationary with respect to the row of slots, whereas the first collecting chamber is reciprocated or rotated.

In general, I prefer to extrude the lamellae through a circular row of slots, the collecting chamber then being a correspondingly circular collecting chamber. The rotating devices can either be arranged for production of the S-form, or the U-form, or a mixed form between the U and the S.

The product obtained on rotating the collecting chamber as a whole relative to the circular row of slots will have the lamellae arranged as a helix in the extruded tube. The pitch angle of the helix will depend on the relative speeds of rotation, but in case the lamellae are continuous and the process takes place without any movement of the two parts of the collecting chamber relative to each other, the helices must necessarily become very flat in order to obtain a sufficiently small thickness of the lamellae.

In case the die-lips from which the fluid sheet material is hauled off are rotated as a whole, the nip of the haul-off rollers must be constructed to rotate in similar manner. As an alternative to the rotation of the die-lips, the part of the device containing the row of extrusion orifices may be rotated, in which case the main channels feeding the extrusion orifices will have to be connected to the extruders through suitable concentric revolving fittings.

If the row of slots and collecting chamber are both linear the movement between the chamber and the slots, or between one side of the chamber and the slots has to be reciprocal, with the result that the lamellae will be folded back and forth upon themselves.

Comparing the effect of the different forms of the lamellae, the S-form, or those mixed forms which are predominantly S-formed, generally are more suitable than the U-form and those mixed forms which are predominantly U-formed. This is due to the fact that in a certain, central layer of the sheet of U-formed lamellae the latter gradually change their traversal angle from the indicated marginal value of 2° to 90° and back to 2° and coincidentally the thickness of the reinforcing lamellae generally will be greater than the indicated margin of 10 microns at least within a portion of this layer. Such deviations in a central layer decreases the strength. If, however, the sheet of U-shaped lamellae (hereunder mixed forms still having a U-like cross-section) is cleaved through the core, the resulting sheets, in which the lamellae have the form of a half U, hereinafter called the J-form, will have improved abrasion resistance on the surface which formerly was in the core, wherein the lamellae are arranged in a kind of pile intimately connected by the filling material. This cleavage can with advantage take place during haul-off by means of a blade inserted into and parallel to the long slot of the extrusion device, but it can also take place after haul-off by means of a band saw or the like.

However, the preferred way of achieving such cleaving, particularly with view to production of the J-form, is to avoid any extrusion of the first polymeric material in a core or interior region of the sheet material. This embodiment can be done by use of an extrusion device in which first orifices are located in zones on both sides and spaced from an interior plane parallel to the margins of the row of orifices. Because of the absence of any first polymeric material in a core stratum, the cleaving will be very much facilitated, and can often be carried out by simple peeling apart. In case the filling material has lower melting point than the first polymeric material, peeling preferably is carried out at a temperature where the second extrudable material is fluid or semi-fluid, but the first polymeric material is solid.

As mentioned, the surface formed by cleavage generally exhibits increased abrasion resistance because it consists of reinforcing lamellae portions in pile-like arrangement, connected by the filling material. If, however, the abrasion resistance is of less importance, but high tensile strength is aimed at, the lamellae portions near the cleaved surface are preferably smeared out by rolling in fluid or semifluid state. The J-form will hereby be converted to an S-form.

While the directly formed S-lamellae generally are longitudinally directed in the sheet, the V and J lamellae as well as the S-lamellae formed via the J-form generally will be directed practically laterally. In any case, it will normally be preferable to use lamellae which are continuous over one of the principal directions of the area of the sheet material, whereas the chopped lamellae arranged in rows may be advantageous in cases where, because of a particular choice of materials, it may be difficult to obtain sufficient fineness of the lamellae by a one-step smearing-out, or in cases where the filling material is a porous material, and it is desirable to give the reinforcing material a slightly discontinuous structure in order to allow a certain passage of liquids or gases through the material.

The sheet material according to the present invention may comprise lamellae of at least one further extrudable material interspersed with the lamellae of the first polymeric material and the lamellae of the second extrudable material. This may be an adhesive suitable for bonding the lamellae of said two materials together, such as, for instance, a mixture of the principal polymeric components of said two materials, or a graft- or block-copolymer of both. Of these possibilities, the graft- or block-polymers generally exhibit the best cohesive strength, whereas the mixture generally is cheaper. In order to increase the cohesive strength of the said mixture, the components should have relatively high molecular weight and should be relatively soft modifications of the respective polymers.

The adhesive material or other material or materials interposed between the two sets of lamellae are injected by means of a separate extruder or extruders through separate channel system or systems to a separate set or sets of extrusion orifices in the row of orifices of the extrusion device. It is within the scope of the invention to arrange the sheet with several different first polymeric materials and/or several different second extrudable materials in the form of separate sets of lamellae. In actual fact, the extrusion device may comprise a rather great number, say 7, of separate channel systems and corresponding sets of orifices.

In order to obtain the highest possible strength, the first polymeric material should generally be a crystalline polymeric material, and whenever possible, the latter should preferably be oriented.

In one embodiment of the present invention, said second extrudable material consists of a mixture of inorganic solid particles and a polymeric binder therefor. Such material may be particularly cheap. These inorganic, solid particles may, for instance, be carbon, or talc, or water-insoluble oxides, sulphates, silicates, carbonates, or sulphides normally used as filling material.

In another embodiment of the present invention, said second extrudable material is a cellular polymer material. In this form of the invention, there is obtained a combination of strength and volume which for instance makes the material suitable for bookprint paper and several kinds of wrapping material. The volume facilitates the handling of thin sheet material through an increase of stiffness, and with regard to packaging uses the material is suited for protection against impact actions. Because of the very limited number of actually available polymer substances for making cellular products, it will normally be difficult to find suitable combinations of first polymeric material and cellular material which are capable of uniting directly, thus it is normally necessary to interpose a set of adhesive lamellae. The expansion to form the cellular structure can take place by well-known methods either during haul-off or later, however, the last mentioned possibility seems to be preferable in most cases, as the expansion tends to weaken the lamellae of the first polymeric material when carried out while the latter are fluid. The lamellae of the first polymeric material may, in fact, facilitate the expansion by setting up a barrier against diffusion of the expansion agent. The materials may be selected with regard to this effect.

When this embodiment of the invention is applied to make substitute of bookprint paper or for other very light-weight purposes, it may be preferable to obtain the desired small thickness by cleaving a thicker sheet according to the invention along at least one plane parallel to its surface. This can be done with use of cleaving apparatus known from the leather industry.

A suitable combination of materials for the embodiment of the invention, in which the second extrudable material is cellular, is polyethylene as the first polymeric material, cellular polystyrene as the second extrudable material, and an adhesive material being interposed.

In another embodiment of the present invention, the lamellae of the second extrudable material comprise a split-fibre network. This provides for a material of high absorbing power. Suitable materials for producing such split-fibre networks are well known in the art. It should be understood, that the term split-fibre networks also comprises fibres in the form of needle- to thread-formed crystal formations of a crystalline polymer bunched together to a network structure, even when the splitting has been carried out without any molecular orientation being present.

In a further development of this embodiment also the first polymeric material comprises split-fibre network material, however, of higher strength and lower average fibre fineness than that forming the lamellae of the second extrudable material. In this form, the product is suitable as layer(s) in non-woven fabric or even as an independent non-woven fabric either for disposable apparel, table cloth, window curtains and the like, or for sanitary textiles or filter materials. The methods of producing the fibrous networks by suitable choice of raw materials (generally intimate mixtures of different polymers) and by processes subsequent to the extrusion of the sheet (such as drawing and swelling and/or leaching) can easily be carried out by an expert by adaption of the known art.

In still another embodiment of the present invention, the lamellae of the first polymeric material consist of crystalline, oriented polymeric material, whereas the second extrudable material has a higher flexibility than the first material. This material has a surprising overall strength and is very suitable for heavy duty bags, for different kinds of wrapping material and for many other purposes, where in particular a combination of tensile strength, flexibility, initial tear strength, tear propagation strength and impact strength is required. It appears that the flexible lamellae are very suitable for smoothing out the force actions of tearing and for absorbing shock actions.

The flexible filling material can, in order to establish the intimate adhesive bonding, be a co-polymeric modificaton of the principal polymeric component of the first polymeric material. Thus it can, with great advantage, be a block-copolymer containing segments of the principal polymeric component of the first polymeric material and segments of an elastomer, or alternatively, a graft-polymer having branches of the principal polymeric component of the first polymeric material grafted upon an elastomeric backbone.

In case the more flexible second extrudable material is orientable, it should preferably not be in oriented state in the end product as it ought to exhibit a high ability to yield without breaking. Thus, when the melting range of this material is below the melting range of the first polymeric material, as it will normally be, the orienting may be carried out while the second extrudable material is fluid but the first polymeric material is solid, or alternatively, the sheet may be annealed at a suitably high temperature subsequent to the orienting in order to destroy the orientation of the second extrudable material but not that of the first polymeric material.

The lamellae of second extrudable material may extend beyond the lamellae of first polymeric material to constitute at least one surface layer of the sheet. This is often useful when the second material has a lower melting range than the first material, as it enables sealing together of two sheets without ruining the orientation in the lamellae of the first material. This extension of the lamellae is obtained by making the orifices in the row extend correspondingly one set beyond the other. However, a material suitable for the flexible filling lamellae will often be too sticky for being suitable as a surface layer. It is preferable to intersperse with the lamellae of said two materials lamellae of a crystalline polymeric material having a substantially lower melting range than the first polymeric material. This lower melting, crystalline material should be adjacent at least one surface and extend beyond both to form at least one surface layer of the sheet. Because of its lower melting range it serves the sealing of the material, and because of its crystallinity it is non-sticky and will exhibit a suitable cohesive strength. Preferably this surface material should only overlap the adjacent lamellae of the first polymeric material over a relatively small distance. For obtaining such arrangements, the slots in the row are constructed correspondingly.

In order to obtain, for instance, very thin sheets of high and relatively balanced strength, the sheet material can with advantage be biaxially molecularly oriented. Biaxially oriented film material normally exhibits high tensile strength but extremely low tear propagation resistance. However, it has proved that the product according to this embodiment of the present invention provides a surprising improvement of tear propagation resistance.

Still higher tear propagation resistance is obtained when the lamellae of the first polymeric material have one predominant direction of molecular orientation and the sheet is laminated to another sheet having a different predominant direction of orientation. Preferably, the last mentioned sheet should also be a sheet of oriented lamellae of the first polymeric material and flexible lamellae of the second extrudable material according to the invention.

The best results as regards tear propagation resistance as well as the overall strength properties have been obtained with sheets of such cross-laminated type, when the sheet or sheets in addition to the orientation in the predominant direction also have a substantial orientation in another direction. I herewith mean that the area of the sheet material should be drawn at a higher ratio than the ratio of increasing any of the linear dimensions during the orientation. Said ratios can be detected in the end product by means of X-ray defraction techniques.

The sheet of oriented lamellae of the first polymeric material and flexible lamellae of the second extrudable material may with advantage be made from high-density polyethylene as the first polymeric material, as this polymer is cheap and technically suitable. The corresponding second extrudable material may, for instance, be a copolymer between ethylene and vinylacetate, which is suitable for establishing a non-sticky sealable layer.

Alternatively, the first polymeric material may with advantage consist of isotactic or syndiotactic polypropylene, whereas the corresponding second extrudable material may, for instance, be a block-copolymer having segments of polypropylene and segments of randomly o-polymerized ethylene/propylene. Other suitable combinations for any particular purpose can easily be selected by an expert. By use of the existing methods of subdividing sheets, it is generally not possible to obtain subdivided structures of finer thickness than about 0.05–0.1 mm, or in case the sheet is thinner than this, of a thickness about the same as that of the sheet, without using particularly splittable polymers as raw materials or using particular substances admixed at random in order to promote high splittability. In such cases, however, the yarn produced will have a low abrasion resistance, since it has a tendency to split further up.

Similar problems exist for subdividing of filaments. The use of particularly thin film in order to produce the flexibility required for a textile yarn and similar, is generally relatively unpractical, as the manufacture and handling of such fine film is difficult and expensive.

In another aspect the present invention has for its object to produce a sheet or filament having, so to say "predetermined" planes of cleavage produced by means of foreign material inserted in the form of thin layers, which lie sufficiently close for obtaining the desired flexibility of the subdivided material. Thus the principal polymer itself need not be splittable, or may have only medium splittability, for producing textile fibres with improved abrasion resistance. Furthermore, the thickness of the subdivided material can be predetermined by adjustment of the process, and even extremely great fineness can be obtained without the reduction of tensile strength which usually occurs when the splitting has been promoted by substances admixed at random.

The process according to the second aspect of the present invention comprises forming thin structures including film and fibres by subdividing extruded sheet material or larger filaments, which comprises feeding a plurality of fluid extrudable materials to a multiplicity of extrusion ducts arranged side by side in an annular pattern, one of said materials being a thermoplastic polymer and being supplied to one group of said ducts, another of said materials being fed to a second group of said ducts interspersed with said first group and being adapted to maintain streams of said polymer separate and distinct, whereby said materials emerged from said ducts as an annular array of interspersed generally parallel lamellae-like streams, advancing the array of extruded streams into an annular collecting chamber communicating with said ducts, rotating at least one side of said chamber relative to the other side, whereby each such relatively rotating side imparts a smearing action to the corresponding side of the annular array of collected streams of material causing said streams to be displaced angularly in the tangential direction from their extruded relationship and thereby stretched to reduce thickness, removing the annular sheet of displaced and stretched streams from said chamber and subsequently after at least said polymeric material has solidified substantially cleaving the connections between the displaced lamella-like streams.

A preferred embodiment of said process comprises feeding fluid first extrudable, polymeric material to first orifices in a circular row comprising a multitude of such orifices in an extruding device, feeding a fluid second extrudable material to second orifices in the row, said first orifices and said second orifices being interspersed with each other, extruding the fluid materials through the orifices into an annular collecting chamber that extends along the length of the circular row, rotating one side of the collecting chamber relative to the other, thereby dragging out the sides of the extruded lamellae to substantially reduce their thickness, while these advance in the direction of extrusion, and substantially cleaving the connections between the lamellae of said first polymeric material. By the combined mixing and extrusion process a sandwich-like structure of many layers of the two materials will be formed, and the subsequent cleaving is based on this structure.

This cleaving may consist in cracking the second material, or making the inter-faces between the lamellae slip, or dissolving the second material, at least partly. In any case the cleaving must be carried out in such a manner that it does not substantially harm the first material. All types of mechanical cracking may be promoted by including in the second polymeric material a slipping agent, for example an oil which is soluble in the fluid polymer but bleeds out on solidification of the latter. Cracking the second material or cracking the two sets of lamellae away from each other can be done by rubbing, twisting, drawing, rolling, impacting, bending, brushing, or by acoustic or chemical action. Several of these actions may be used in combination, in particular it is effective to produce a longitudinal rubbing action after removal of some part of the second material.

In order to prevent the material from changing its character essentially through a continued cleaving produced by the normal use, the cleavage during processing should preferably go so far that each of the lamellae of first polymeric substance is preferably separated almost totally from its neighbours. However, a very small amount of interconnections between adjacent lamellae is preferably retained in order to facilitate the handling of the material. In any case, the cleavage should be sufficient to substantially change the character of the product. Thus the sandwich-like structure can normally be detected in the end product.

In order to obtain the most regular thickness of the lamellae, the orifices for extrusion of the latter into the collection chamber are preferably closely spaced, elongated slots, forming an angle with the direction of the row.

If the process of manufacture only comprises the steps disclosed above, flake-formed structures will be produced rather than fibre-like structures, but the product will still be suitable for many yarn purposes after twisting, because of the extremely small thickness which is made possible by the invention. However, the invention preferably involves a further step of producing substantially parallel splits in each of the lamellae of the first polymeric material in order to convert the latter to thin ribbons, strips, staple fibres or splitfibre networks. It is most expedient to perform the production of said splits at least in part before the cleaving of the sandwich arrangement is completed, as the coherence of the material facilitates the splitting. This production of splits can, for instance, be carried out by cutting with knives, or tearing with needles, e.g. during passage over a needle roller. Furthermore, is may be advantageous to make a first splitting in form of cutting the extruded sheet to ribbons and subsequently to form splits in each of the lamellae, provided the latter are oriented by a lateral drawing between rubber belts (this splitting method being in itself well-known in the art) or, alternatively, by lateral rolling between rubber surfaces. The final cleaving of the sandwich structure may follow by a rubbing in the longitudinal direction. In any case it is generally preferable to orient the material before the cleaving, as this facilitates the separation of the lamellae from one another.

In an embodiment of the invention the production of splits in each of the lamellae is performed at least in part before or during the haul-off from the extruding device. This can be carried out by passing the fluid materials through a kind of grid, situated at a place in the extrusion device where the formation of the sandwich-like structure is practically terminated whereby any of the lamellae will be subdivided into sandwich-like strips or filaments. By the said methods the ribbons or filaments can get a cleaner edge as compared to cutting in solid state, and further, the ribbons or filaments can be made finer in this way, as the material can generally be deeply drawn down in connection with the haul-off. As will be understood, these methods of splitting, as well as simple cutting are carried out without requiring fragility of the first polymeric material. Thus it is possible to use a tough polymer of high abrasion resistance, such as for instance the normal polyamides or polyethyleneterephthalate. The second material may in these cases be, for instance, small amounts of polyethylene or polypropylene, which may be leached by means of hot toluene, or xylene, or another solvent, and may be recovered on cooling of said solvent. However, it is also possible to use, as the second material, a very fragile material such as polystyrene, which may become almost powdered during a rubbing action or other suitable mechanical cleaving process, whereafter the main part of the brittle material may be removed by means of vacuum cleaning or by sweeping with an air jet. After collection it may be re-used, since small amounts of the first polymeric material, which may also have gone into dust, make no harm.

A cleaved strip or filament produced either by splitting in the melted state (as described above) or by cutting in solid state with very closely spaced knives can be used directly as a textile yarn, no chopping to staple with subsequent carding being necessary. So can the cleaved material when it has first been split to ribbons and subsequently split further to a splitfibre network. Normally, however, a twisting process is desirable. Alternatively, the split and cleaved material either in form of yarn or wet can be chopped to staples and may be mixed with other fibre material. Furthermore, a web of the material according to the invention can be used as a layer in a non-woven fabric.

Another embodiment of the present invention further comprises feeding at least one additional extrudable polymeric material to orifices interspersed with those for the first and second extrudable materials, said additional material being capable of strongly adhering to the lamellae of the first polymeric material and of remaining in such adhesive connection upon the cleaving. This provides for a very simple method of producing the socalled bicomponent fibres, which, as is well known, are suitable for obtaining a very effective crimp, or which may be used for obtaining composite properties of the fibres, e.g. to apply to one or both surfaces of the fibre a more hydrophilic sustance suitable for dyeing or to increase the ability of transporting moisture. In this connection the present invention provides for a much simpler and cheaper method than the known art, in which each filament has to be formed separately in a bicomponent nozzle. By use of the present invention it is furthermore possible to apply up to a rather great number, say 6, different components in each fibre. A separate extruder and a separate channel system are used for each material. The choice of materials for obtaining the desired properties as well as for avoiding cleaving of the layers within each bicomponent fibre can easily be made by an expert. This embodiment can also with advantage be used to produce fibres having very fine "hair" on their surface or surfaces. For this purpose the materials and treatments are so chosen that the additional material is disrupted into fibre-like particles still intimately adhering to the lamellae of the first material. This is best obtained by using, as additional material, a polymer in a polymer emulsion of which one of the components is on principle the same as, or at least very closely related to, the principal polymer of the first polymeric material. The other component or components of said emulsion should be leached or disrupted in swollen state.

In a similar manner, fibres with "hair" can be obtained without use of additional material, when the second material is a polymer in a polymer emulsion suitable for the purpose. However, it is difficult to obtain a product of comparable quality in this way, although it has the advantage of simplicity.

In fact, lamellae of the second material can also remain in the yarn or web as useful separate fibres, provided the cleaving is produced by slipping apart the two sets lamellae without any substantial damage being made to either of them. As an example, lamellae of the normal, commercial polyamides such as hexamethyleneadipamide or polycaprolactame can easily be cracked away from lamellae of polyethyleneterephthalate, a useful two-fibre yarn or web resulting. In similar way many other combinations can be made by an expert. It is to be understood that the term "first polymeric material" and "second material" each can comprise several different materials each being extruded through a separate channel system and separate orifices of the row.

By the extrusion method described above, the lamellae will be in the form of continuous ribbons, all being substantially parallel. Normally the lamellae will be arranged longitudinally in the extruded tube, but may also form helices by suitable rotations of the devices, if desired. By forming the lamellae in halices, or splitting the tube helically, or both, it is possible to obtain an angle between the continuous dimension of each lamellae and the direction of splitting, thus producing staple material of substantially constant length.

A further aspect of the present invention relates to the production of fibres, including direct production of yarn, by splitting of flat strips, and more particularly to the manufacture of strips suitable for such use. Generally, the yarn produced from the strip of the invention will consist of several components which normally are united to form bi-component fibres, and the components will generally be polymeric materials, but also other materials may be used, such as will be described hereinafter.

The existing processes for splitting up strips to staple fibres or to yarn make use of a fissility formed either by molecular orientation or by a fiber-formed or fibre-like oriented morphology depending on the presence of two or more different phases or materials. It is known that the morphology most suitable for easy splitting is one which predominantly produces splitplanes transversal to the first dimension of the strip, preferably under an angle relatively near to 90°. The aim of the present invention is to produce such a morphology in a particular efficient manner.

This is achieved by first extruding a continuous sheet composed of a plurality of materials in a sandwich-like arrangement having its layers extending substantially in the longitudinal direction of the sheet and substantially parallel to the flat dimension of the latter, and then longitudinally subdividing said sheet in the extrusion device into flat strips having their longer cross-sectional dimension at an angle to said layers. The invention is based on the experience that layers parallel to or nearly parallel to the flat dimension can be produced particularly regular, even in extremely small thickness, and it has now been found that the inversion of dimensions resulting from the subdivision step referred to can be carried out in simple manner without substantially disturbing the desired regularity of the layers.

It should be understood that the word "sheet" as used herein covers the product continuously flowing through the extrusion device and having the cross-section of a sheet (including a tube), although the zone in which this form exists (before it is subdivided) may be very short. The words "flat strips" should be understood so as to cover flat, relatively narrow structures or ribbons flowing continuously through a zone, that may be short. Said ribbons may be cut to short lengths at the end of or after the extrusion.

Extruder heads for the simultaneous extrusion of two or a small number of layers of different polymeric materials have since long been used for the production of composite packaging film materials. In fact similar dies, but constructed for the simultaneous extrusion of a great number of layers are suitable for forming the sandwich-like arrangement in the practice of the present invention. For making particularly thin layers, which may be down to 1 micron or even thinner, the best way of producing the sandwich-like product is by first feeding a first fluid, extrudable material to first orifices in an extruding device, feeding a second fluid extrudable material to second orifices in the row, said first orifices and said second orifices being interspersed with each other, extruding the fluid materials through the orifices into an annular collecting chamber that extends along the length of the circular row, and rotating one side of the collecting chamber relative to the other thereby dragging out the sides of the extruded lamellae to substantially reduce their thickness while they advance in the direction of extrusion.

A simplified method of producing said sandwich-like arrangement consists in mixing the materials at random, but only to form a relatively coarse dispersion of the materials in one another, and flattening the shape of each of the particles of this dispersion to form elongated flakes by passage through a sheetforming chamber.

Generally, the structure most prone to splitting is produced if the subdividing into strips takes place by means of very thin blades. In this case, however, it is very difficult to avoid a reunion of the strips immediately after the extrusion. A means to counteract the tendency of the strips to fuse together is lubrication, e.g. with a mist of oil. For practical reasons, however, it is preferable, instead of using thin blades, to substantially reduce the dimension of the strip laterally of the sheet during said subdivision. It may still be necessary to take precautions for avoiding fusing together of the strips, e.g. to extrude the strips downwards into a quench bath. If the viscosities of the materials are pronouncedly different from one another, the reduction of said dimension normally will make the layers form micro-pleats. This configuration will tend to render the splitting process more difficult, but will at the same time lead to improved textile properties. If desired, the tendency to micro-pleating can be completely or practically avoided by adjusting the flow-properties of the materials at the relevant temperature to one another and by avoiding an exaggeration of the reduction of said dimension. When the sandwich-like arrangement has been produced by the circular smearing-out action referred to above, as will generally be preferable, the slots through which the strips are extruded will normally form a circular row where the flat dimension of each of the slots is radial or at least forms an angle to the tangency of the circle.

In another embodiment of the present invention, the dimension of the strip perpendicular to the sheet is increased during the subdivision step in which the strips are formed. It is hereby possible to form relatively wide strips or rather ribbons, the latter being suitable for the manufacture of webs for instance for non-woven fabrics and for relatively coarse yarn. Particularly in this case a simultaneous reduction of the other dimension of the cross-section may be advantageous for practical reasons. Thus, one cross-sectional dimension of the chamber forming a strip will gradually widen at the same time as the other cross-sectional dimension gradually narrows down.

It may be advantageous to carry these changes so far that the cross-sectional dimensions of each of the chambers forming a strip is inverted, i.e. the chambers start in a flat shape with the flat dimension essentially parallel to the flat dimension of the sheet and ends in a flat shape with the flat dimension essentially perpendicular to the flat dimension of the sheet.

Before being subdivided into said strips, the sandwich-like sheet may pass through a grid cutting through each of the layers and of a division which is finer than the division between the means to form said strips. Because of the subsequent compression which takes place in the zone where the strips are formed, the dividing lines in the final strip may hereafter become extremely close to one another. If the layers of the sandwich are also made very fine, as by the smearing action described, the resulting fibres may become finer than, for instance 1 denier.

When the described system of smearing-out the layers to form the sandwich-like arrangement is used, the row of strip-forming chambers and the row of orifices situated before the smearing-out zone may be rotated relative to each other. By this rotation each layer will also become divided length-wise, and by the subsequent splitting process the strands will easily be transformed to staple fibres.

The strip material produced according to the invention can be disrupted to fibre products in different ways, some being particularly cheap and some being directed particularly to the creation of suitable fibre surface properties. The disruption generally involves a mechanical treatment which either splits the structure of one of the materials or makes the inter-faces between the layers slip. Additionally to or in some cases independently of the mechanical disruption, leaching out of a part of the product may be applied. Furthermore, the mechanical disruption either in the inter-face or internally in one of the materials can with great advantage be promoted by including in one of the materials a slipping agent, for instance an oil which is soluble in the material while this is melted or semimelted, but bleeds out when the latter solidifies. Alternative or supplementary agents to aid the disruption are swelling agents and expansion agents, such as volatile solvents which are preferably applied to the product after extrusion and solidification of the product. Mechanical treatments suitable for the disruption are in particular rubbing actions, but also twisting, drawing, rolling, impacting, bending, brushing, or acoustic splitting actions.

Generally the disruption should not be carried so far that the fibres become completely separated from one another, but at least some interconnection in networkform, as obtained by incomplete splitting, is preferable in order to ease the handling of the yarn or web.

This aspect of the invention enables a practical production of splitfibres from materials which are relatively unsplittable even in molecularly oriented form. Such materials are particularly suitable for most textile purposes because of their high abrasion resistance, and it has been highly desirable to extend the practical advantage of splitfibre technique to such materials. Examples of such split-resistant materials are: polyamides, polyesters, block copolymers of alternate crystalline and elastomeric segments, and graft polymers having an elastomer backbone and crystalline grafts.

If one material is split-resistant and another is either directly splittable or rendered splittable by a suitable treatment, and furthermore the adhesive bond between the two materials is sufficient for preventing them from separating totally from each other during the splitting, then the resulting fibres will be of bi-component nature and consist of structurally undisrupted strands in combination with strands in structurally disrupted state. This provides for a suitable combination of properties, as the split-resistant strand provides abrsion resistance whereas the disrupted material provides surface properties which are suitable for textile fibres.

In general, the invention is suitable for obtaining bicomponent effects such as texture through differential shrinkage or the combination of moisture transportability with easy drying obtained by combination of hydrophobic and hydrophilic polymers. When using the invention for producing bi-component fibres from materials, which are pronouncedly incompatible, it will generally be advantageous to introduce a third component in the sandwich, this component acting as adhesive (for instance a mixture, graft copolymer or block-copolymer between the two materials), and sometimes also a fourth material which is selected to aid in the separation of the laminated sets from one another may be needed or suitable. There exist no serious practical difficulties in modifying the smearing-out system described for working with four materials instead of two materials only.

An embodiment of the present invention is characterised in that a polyamide is used as one of the materials, and a polyester as another of the materials. Thus both constituents will exhibit high abrasion resistance, and a differential shrinkage due to the different moisture absorbance gives high curling effect. Furthermore, the polyester contributes with high crease resistance whereas the polyamide contributes with relatively high dyeability. The polyester can with advantage be polyethyleneterephthalate and the polyamide either polycaprolactame or polyhexamethyleneadipamide.

In another embodiment of the present invention, one material used is either a polyamide or a polyester and another material is polyolefin present in amounts higher than 50%. The cheap polyolefinic material hereby mainly acts as a filler whereas the polyamide or polyester provides the desired abrasion resistance.

It has been mentioned that the invention can be applied to glass. In this connection waterglass is suitable as layers in the sandwich product to effect the disruption.

Likewise, instead of true polymers, pre-polymers may be used as materials of the layers and will then be polymerized upon termination of the extrusion.

In combination with one of more polymeric materials a non-polymeric material, e.g. a paste may be used for facilitating the separation of the layers.

A still further aspect of the present invention relates to a bi- or multi-component fibrous product particularly suitable for the production of synthetic textiles. Generally, the components of such a fibrous product are polymeric materials, but also other materials may be used as the components of such products, such as will be described hereinafter. The product may be in the form of staple fibres, filaments or fibre networks.

It is to be understood that the term "fibres" as used below is to be taken to comprise structures, which in their geometrical shape are different from the conventional concept of fibres, but still in many respects behave substantially in the same way.

Fibrous products are known comprising interconnected strands of different components in order to obtain curl through differential shrinkage, or to obtain a combination of different properties such as moisture transportability and dyeability resulting from a hydrophilic component in combination with wet strength and easy drying resulting from a hydrophobic component. However, the possibility of obtaining desired combinations is limited by the circumstance that components having substantially different properties will usually have a poor adherence to one another.

It is an object of the invention to provide a bi- or multi-component fibrous product, in which the adhesion between the components is improved owing to a particular structure of the product.

According to the invention, there is provided a method comprising the steps of forming a sandwich-like product consisting of alternating substantially parallel microscopically thin layers of at least two materials, at least one of said two materials being a polymeric material, subjecting said product to a simultaneous compression in one direction substantially in the plane of the layers and expansion perpendicularly thereto also in the plane of the layers under conditions at which the materials are in states of different fluidity, subsequently solidifying the structures thus obtained and disrupting the continuous connections between the layers of said polymeric material.

The fibrous product prepared by said method comprises fibres of a first material in the form of ribbon-like strips of micro-pleated cross sectional configuration laminated with filamentary strands of a second material.

By a micro-pleated configuration is to be understood one in which the spacing of the pleats is less than 100 microns. Normally, this spacing will be 10-30 microns, and it may amount to just a few microns.

The pleated configuration of said ribbon-like strips tends to produce a more intimate contact between these and the filamentary strands of the second material so that an improved adherence is obtained.

An additional advantage of the pleated cross sectional configuration or profile is that it generally results in a substantially improved bulk and springiness.

The increase of bulk thus obtained, as contrasted to that resulting from a crimped configuration along the length of the fibres—which may of course also be present in a product according to the invention—will not decrease significantly when the fibrous product is subjected to such longitudinal tensions as normally occur in use.

Generally, the fibres of the first material have at least two and preferably a higher number of pleats.

The filamentary strands can also be in the form of ribbon-like strips of pleated cross sectional configuration fitting into that of the strips of said first material. This product presents the advantage of having a particularly high bulk and high elasticity when compressed or flexed.

It should be understood that the invention applies not only to thermoplastic polymers, but also to other polymers, which are capable of being shaped in said sandwich-like arrangement, e.g. cross-linked polymers polymerized in situ or polymers which decompose below their melting point, but are capable of forming a homogeneous film from dispersion of solution. Furthermore, it should be understood that the invention applies not only to organic polymers, but also to glass, which because of its thermoplastic properties can be processed by extrusion on principle in similar manner as thermoplastic organic polymer substances.

The filamentary strands and the adjacent strips of pleated cross sectional configuration can also form a splitfibre network. This facilitates the handling of the product in the making of yarn and also makes it possible to use the product directly as a textile web, such as is well known within the splitfibre art.

The strips of pleated cross-sectional configuration and the filamentary strands may be united by means of an adhesive layer. In the case of polymeric materials, this adhesive layer may consist of a mixture of the first polymeric material and the second polymeric material or may be graft polymers or block copolymers of said polymeric materials.

The two polymeric materials forming the fibrous product according to the invention need not be chemically different by may be chemically identical provided that they have been manufactured in such a way as to have different physical properties. E.g. the filamentary strands may be in the form of micro fibrils, while the pleated strips are in the form of a continuous structure of a chemically identical substance.

A further step of the method of the invention consists in disrupting the continuous connection between the layers of one of said materials formed by layers of at least one other of said materials, whereby the fibrous character is developed.

At the stage just before compression and expansion, the sandwich-like product can either be a relatively thick filament or a flat structure such as a ribbon or a relatively wide sheet which may be tubular. The layers may be parallel or practically parallel to the flat dimension of the product or may traverse over a part of the thickness of the product or the whole thickness of the product and may even by perpendicular to the flat dimension of the product.

As a result of the combined compression and expansion, the product will become internally pleated, i.e. the distance between two adjacent pleats in a layer will be smaller than the thickness of the product. In this connection the aim of carrying out the expansion simultaneously with the compression is to introduce a stress which serves to regulate the pleating.

The sandwich-like product consisting of alternating layers of at least two materials may be produced by extruding alternating layers of said materials. It is generally most practical to extrude a multitude of the layers into a common chamber where they unite. Extruder heads for simultaneous extrusion and lamination of two or a small number of layers of different polymeric materials have since long been used for the production of complete packaging film materials. Similar dies but constructed for simultaneous extrusion of a great number of layers are suitable for carrying out the method according to the invention.

However, the sandwich-like product can also be produced by forming films from solutions or dispersions of suitable polymers and uniting said films to form said sandwich-like product. Furthermore, the forming of said sandwich-like product can be effected by successively casting films or flakes on a roller or belt by melt extrusion or by applying substances polymerizing in situ onto such roller or belt.

A particularly suitable manner of forming the sandwich-like product consists in feeding a fluid first extrudable material to first orifices in a circular row comprising a multitude of such orifices in an extruding device, feeding a fluid second extrudable material to second orifices in the row, said first orifices and said second orifices being interspersed with each other, extruding the fluid materials through the orifices into an annular collecting chamber that extends along the length of the circular row and rotating one side of the collecting chamber relative to the other thereby dragging out the sides of the extruded lamellae to substantially reduce their thickness while they advance in the direction of extrusion. It is also possible to extrude more than two different materials in similar manner.

By the rotation of one side of the collecting chamber relative to the other each of the lamellae is drawn or smeared out laterally until they form the desired sandwich-like arrangement, in which the layers are at a very small angle to the surface of the product. A tendency for higher smearing-out near the surfaces than in the central part of the tubular product can be counteracted by forming said orifices in such manner that each of them extrude less material in the central part than near the surfaces.

When producing the sandwich-like product in an extruder head common for two or more components, each fed through an individual extruder, it is generally preferable that the layers while still in melted state are divided to filaments consisting of narrow laminated ribbons or elongated flakes by passage through a grid of said extruder head.

If the material in film-form is to be subject to the compression after termination of the full extrusion process it is preferable to units the sandwich-like strips leaving said grid to as to form a tubular structure. The sandwich-like strips may be united during the transversal shearing produced by continuously rotating the two lips of a last section of a ring die in opposite directions.

If the sandwich-like product is formed by the smearingout of materials from a multitude of orifices as described above, and if the said grid is steady in relation to said row of orifices, the grid will divide each layer into continuous strips, whereas discontinuous strips will be formed if the grid rotates relative to the row of orifices. Such product consisting of discontinuous strips is suitable for the production of staple fibres according to the invention.

The sandwich-like product may also be formed by extruding the first polymeric material through filament-forming protruding nozzles in a chamber of an extruder head and the second polymeric material through orifices between said protruding nozzles and by uniting the streams extruded in said chamber, the filaments of the first polymeric material being either extruded flat or subsequently flattened.

In practice, the simultaneous compression and expansion can be carried out in different ways, generally while both or all materials are maintained in a melted or semimelted state and thus easy to deform. Thus, it can be effected by rolling of a sheet product in which the layers are perpendicular to the flat dimension or by stretching of the same over a sharp edge, or by rolling of a finely externally pleated sheet material in which the layers are parallel or nearly parallel to the flat dimension of the product. When the conditions are such as to cause conversion of such a corrugated sheet to a flat form, then the external pleats will be converted to internal pleating.

However, the easiest way of forming the micropleats generally is to carry out the step of compression and simultaneous expansion in connection with the extrusion of the sandwich-like product during passage through a chamber with gradually varying dimensions.

If the compression and simultaneous expansion is carried out while both materials are in a truly melted state, the ratio between the melt viscosities of the two materials should preferably be in the range between about 2:1 and 20:1 at the temperature, at which said deformation takes place. If the ratio is lower, the pleats will generally not become as deep as desirable, and if the ratio is higher the structure may become too irregular and the spacing between the pleats too big.

The micro-pleating caused by the compression will of course result in some irregularity of the thickness within a cross-section of each of the layers, no matter whether the compression and expansion take place in fluid or semifluid or in a more solid state. In this connection the most fluid material will tend to adapt its shape to the deformation which the less fluid material tends to determine, thus said irregularities of thickness will be most pronounced in the layers formed by the more fluid material. These irregularities increase the splittability of the individual layers. Thus the material which is intended to retain the highest resistance to splitting is generally chosen to have the lowest fluidity at the temperature where the compression and expansion are carried out.

The process step of disruption can also be carried out in different ways, some being particularly cheap and some being directed particularly to the creation of suitable fibre surface properties. In any case, the treatment must be so chosen in relation to the materials that at least one of the materials retains a continuous or practically continuous structure within areas which are sufficiently big for still exhibiting the micro-pleated configuration. The disruption generally involves a mechanical treatment which either splits the structure of one of the materials or makes the inter-faces between the lamellae slip. Additionally to or in some cases independently of the mechanical disruption leaching out of a part of the product may be applied. Furthermore, the mechanical disruption either in the inter-faces or internally in one of the materials can with great advantage be promoted by including in one of the materials a slipping agent, for instance an oil which is soluble in the material while this is melted or semimelted, but bleeds out when the latter solidifies. Alternative or supplementary agents to aid the disruption are swelling agents and expansion agents, such as volatile solvents which are preferably applied to the product after extrusion, micropleating and solidification of the product. Mechanical treatments suitable for the disruption are in particular rubbing actions, but also twisting, drawing, rolling, impacting, bending, brushinng, or acoustic splitting actions. In any case, the disruption treatment or treatments must of course be so restricted that it leaves fibres of the first material in the form of micropleated strips laminated with filamentary strands of the second material, at least spot-wise.

As mentioned in connection with the description of the fibrous product, the pleated strips and the fibamentary strands may be laminated with an adhesive layer in between. In this case, the disruption treatment generally should be so chosen that said adhesive bond is substantially unaffected, whereas the disruption may for instance take place in the filamentary strand material or by means of a fourth material also forming part of the sandwich structure. Thus said fourth material will be used particularly with a view to an easy production of fibres from the thicker product, whereas the adhesive material is used with a view to the properties of the final fibrous material.

If the layers are not formed as continuous or discontinuous strips during the extrusion process and prior to the step of micro-pleating, but still form relatively wide films, then a splitting of the micro-pleated layers of the first material is necessary either by a cutting action such as by means of needle rollers or series of knives, or by means of the mechanical disruption actions described above. In the last-mentioned case there must be established a suitable balance between the splittability in the pleated layers of the first material and the disruptability of the layers of the first material from one another in order to maintain a pleated configuration. The regulation of the splittability in the pleated layers of the first material can take place by the choice of material as well as by controlling the shape of the pleating, in which connection it should be remembered that, as mentioned above, the material of highest fluidity generally form the configuration which is more prone to splitting. For the production of yarn it is generally preferable to form the strips in the extrusion process prior to the micro-pleating, whereas the splitting after micro-pleating generally is preferable for production of net-formed webs for non-woven fabrics.

If the strips are formed in the extrusion process or by a cutting action it is generally preferable to use a split resistant polymeric material as the first material. The reason for this choice is partly that it enables vigorous disrupting forces to be applied without risk of ruining the pleated configuration, but also and particularly that the pleated configuration is prone to abrasion during the use of the fibrous product. Examples of suitable splitresistant polymers are: polyamides, polyesters, block copolymers of alternate crystalline and elastomer segments graft copolymers having an elastomer backbone and crystalline grafts.

If the fiber material is split resistant and the second material is either directly splittable or rendered splittable by a suitable treatment, and furthermore the adhesive bond between the first and second material is sufficient for preventing the two materials from separating totally from each other during the splitting, then the resulting fibrous product will consist of split-resistant pleated strips laminated with filamentary strands in a structurally disrupted state. This makes a suitable combination of properties, as the splitresistant strip provides abrasion resistance whereas the disrupted material provides surface properties which are suitable for textile fibres.

In such structurally disrupted state the filamentary strands may with advantage consist of micro-fabrillar crystal formation disrupted from one another. Such formations may be formed from crystalline polymers when an oil is dissolved in the latter in melted state and bleeds out on crystallisation during drawing. The oil can subsequently be leached out.

Such a microfibrillar structure is generally produced in its most pronounced form by use of a melted very fine polymer in polymer dispersion (the particle thickness in the melted polymer being essentially below 1 micron) of which one polymer is crystalline and is adapted to form a strong adhesive bond with the first material, and is brought to crystallize in stretched state and while the other disperse polymer is still melted, the latter being subsequently leached out or otherwise physical-chemically disrupted. The microfibrillar crystal formations thus produced generally have diameters from about 0.5 to about 5 microns.

An embodiment of the present invention is characterized in that either the first or the second material is a polyamide and the other a polyester. Thus both constituents will exhibit high abrasion resistance, and a differential shrinkage due to the different moisture absorbance gives high curling effect. Furthermore, the polyester contributes with high crease resistance whereas the polyamide contribute with relatively high dyeability. The polyester can with advantage be polyethyleneterephthalate and the polyamide either polycaprolactone or polyhexamethylenedipamide.

In another embodiment of the present invention, the first material is either a polyamide or a polyester and the second material is a polyolefin present in higher amounts than the polyamide or polyester. The cheap polyolefinic material hereby mainly acts as a filler whereas the polyamide or polyester provides the desired abrasion resistance.

It has been mentioned that the invention can be applied to glass. In this connection waterglass is suitable as layers in the sandwich-product to effect the disruption.

A still further aspect of the invention relates to the manufacture of bi- or multi-component fibres by disruption of a multi-layer sandwich-like structure in which the bondings between some of the layers are adapted to be cleaved under the disruption treatment while others are adapted to resist said cleaving treatment. In the sandwich-like structure the bondings adapted to be cleaved and those adapted to remain should vary generally in sequences and there should generally be many layers so that many fibres are formed from one sandwich-like structure. This method of producing bi- or multi-component fibres is much simpler than the known methods for conjugent spinning of fibres which involve complicated channel systems which cannot or can only with great difficulty be constructed in streamline form. The advantages of this aspect of the present invention are most pronounced when making fibres consisting of more than two conjugent strips, e.g. when extruding strips of incompatible polymers with a layer of an adhesive component between.

As described above adhesion can be increased by imparting a "cross-crimped" configuration to the strps, but the aspect described is not limited to this configuration.

Generally the multi-layer structure is prepared from a sheet built up from fluid layers, and subsequently each of the layers is longitudinally subdivided to fibres or fibre-like products. The formation of this sheet preferably takes place by co-extrusion of at least three extrudable materials, at least two of which being synthetic polymers. The third component may also be a synthetic polymer, but may alternatively be a non-polymeric, but co-extrudable separating component. The components are extruded in interspersed relationship, each forming a plurality of thin layers extending substantially parallel to the faces of the sheet. For further details of making the sandwich structure reference is made to pg 18, line 28-pg 19, line 2. When using the rotary device for subjecting the interspersed streams to a shearing action the melt viscosities of the major components should be at generally similar level.

It is generally advantageous to carry out the above-mentioned longitudinal subdivision in fluid state before the material leaves the co-extrusion die, and in fact the die-zone where the fluid product has sheet form may even be less than 1 cm long. By said division the product obtains the form of an array of composite filaments or tapes (or a profiled sheet which is further split at a later stage).

In an alternative embodiment the longitudinal subdivision of the layers may be carried out after extrusion and solidification and generally also orientation of the sheet. Thus the subdivision may be carried out by means of pin-rollers, melting devices or frictional splitting devices performing treatments which are well-known in the art of splitting oriented films. This latter embodiment is generally preferable if it is desired to produce a series of fibres which are interconnected in the form of a net. The subdivision in fluid state on the other hand is generally preferable when producing real yarn or staple fibres.

The above-mentioned subdivision of the layers is to be distinguished from the separation of the layers, although these steps may in fact be combined into one, i.e. if both take place by frictional treatment after solidification and orientation of the multi-layer sheet. Alternatively the subdivision of the layers can be carried out in solid state before or after the cleaving step by means of more direct splitting means such as pin rollers and the like. As described above the present aspect of the invention comprises the provision in a multi-layer product the provision of alternating bondings which are adapted to be cleaved (peeled) and bondings which are adapted to resist the cleaving treatment. The cleaving can be carried out or supported by use of a solvent which acts on one of the components of the sheet structure, but not on the others. Since it is normally easy to find selective solvents, the choice of components is limited almost only by the requirement for adhesion.

Generally it is preferable, however, to avoid solvents or to use solvents (swelling agents) only as a means for accentuating a tendency of disruption which is already established by the choice of incompatible materials in direct contact with each other or by use of a component which easily disrupts in itself.

Thus in the preferred embodiments the said multi-layer sheet comprises repeated series of layers intimately adhering to one another in solid state alternating with layers forming zones of weak bonds between said series of layers, also in solid state. In any case at least the final part of the cleaving is carried out when at least one of the components is in solid state (and thus the general character of the sandwich structure is solid), but the cleaving may be initiated by expansion while the structure is in fluid state.

Said repetitive series of strong bonding/weak bonding can be obtained in different ways. The major components of the fibre (A and B) can for instance be selected as two pronouncedly incompatible polymers. It is then necessary to use as a third component (C) an adhesive for said two incompatible polymers, and the sequence may be as follows:

ACBACBACB

Because of the incompatibility the inter-faces between A and B thus will be zones of weak bonding while the three layers in each series ACB will adhere intimately to one another.

Although it will generally be possible to find an adhesive component for any selection of A and B, e.g. a graft or block copolymer between A and B, ther may be practical or commercial limitations, and it may often be advantageous to use two adhesive components $C_1$ and $C_2$ of which $C_1$ is mainly capable of bonding to A, and $C_2$ to B, while $C_1$ and $C_2$ adhere to one another. The succession would then be as follows: $AC_1C_2BAC_1C_2B$.

The cleaving may be facilitated by adding small amounts of a suitable separating component (D), and the sequence will hereafter be as follows:

ACBDACBDACB

In this connection D can be a component comprising a slipping agent or a component which easily can be leached out before the final part of the cleaving.

There are practically no constructional difficulties in co-extruding five instead of four components, and thus two adhesive components ($C_1$ and $C_2$) ca be used together with the separating component D, viz.

$AC_1C_2BDAC_1C_2BDAC_1C_2B$

To my knowledge it has not formerly been possible to form composite fibres from incompatible polymers. This is very important as incompatible polymers generally represent significantly different properties.

Thus one of the polymers may be highly hydrophobic and possessing high wet strength, while the other is hydrophilic and water-absorbing. Alternatively, the difference between the melting points of said polymers may be particularly high and permit the fusing of one of the components of the fibre (in the manufacture of paper or non-woven fabrics) without substantially affecting the molecular orientation of the other components. Although similar significant differences can be achieved by conventional spinning methods, this generally requires use of an expensive copolymer as one of the major components, because only two polymers can be co-extruded and these must satisfy both the requirement for adhesion and the specific requirements for the application. By use of the present invention as described in the foregoing the desirable combinations of properties may generally be achieved by means of cheap polymers, generally homopolymers, while the generally more expensive copolymers which are used or adhesive purposes are used in small concentrations in the form of thinner layers.

Thus homopolyamides such as nylon 4, nylon 6, nylon 66, nylon 11 or 12 can be combined with homopolyolefins such as polyethylene or polypropylene by means of a thin layer of polyolefin/acrylic acid copolymer (or a suitable salt of the latter). And polyethyleneterephthalate can be combined with homopolyamides such as nylon 4, nylon 6, nylon 66 by means of a layer of a suitable adhesive component which may be a blend of a copolymer based on polyamide and one based on polyethyleneterephthalate.

As a further example of forming bi- or multi-component fibres from very different inexpensive polymers the combination of homopolyethyleneterephthalate and homopolyolefins can be mentioned. For this combination it will be advantageous to use the composite adhesive layer system ($C_1,C_2$) where $C_1$ can be the well-known block-copolymer of polyethyleneterephthalate and polyethyleneglycol, and $C_2$ a suitable copolymer of a polyolefin and acrylic acid.

The above-mentioned separating component D may be a polyolefin blended with thermostable mineral oil (e.g. in a ratio of about 50:50) and thickened by means of kaolin which is surface-treated for dispersion in hydrocarbons or may be polyoxyethylene likewise blended with kaolin which is surface-treated for the dispersion.

The separating component D should generally be applied in small quantities so that it scarcely forms continuous layers. The polyoxyethylene is preferably leached before the final step of the mechanical cleaving process.

However, the present invention can also be used to form bi- or multi-component fibres from major components A and B which can bond directly to each other. For this purpose a particular separating component E is used, and the sequence may be as follows:

ABEABEABE ... or ... ABAEABAEABA where E is a separating component. This may be a polymer which is pronouncedly incompatible with both A and B, so that it separates from both A and B at the inter-faces and forms separate mono-component fibres remaining in the final product. E.g. A and B both may be polyamides such as nylon 4, nylon 6, nylon 66, nylon 11 and nylon 12 or A may be homopolyethyleneterephthalate and B a copolymer of polyethyleneterephthalate, whereas E may be polypropylene, polyethylene, polystyrene or polyoxymethylene. A and B may also be two compatible polyolefins, e.g. polypropylene and a relatively hydrophilic copolymer of ethylene and acrylic acid, while E may be polyoxymethylene.

E may also be a component which can be internally disrupted by mechanical action, such as relatively low-molecular weight polystyrene blended with kaolin powder, which is surface treated for dispersion into hydrocarbons. Furthermore, E may be an expandable polymer such as expandable polystyrene or a polymer which easily can be leached, generally after some mechanical cleaving treatment—e.g. polyoxyethylene which is leached with water.

Finally, it is possible to form two kinds of bi- og multicomponent fibres simultaneously. Thus, if the major components A and B of one set of fibres are mutually compatible and the major components F and G of the other set of fibres are mutually compatible, but B and F are mutually incompatible and A and G likewise mutually incompatible, then the sequence may be as follows:

ABFGABFG

In this embodiment A and B may for instance be polyamides and F and G may be polyolefines.

By use of an extruder die for five and six components the adhesion between A and B and/or between F and G may be increased by means of one or two adhesive components, or a separating component may be used. By a suitable choice of adhesive component(s) and/or a suitable separating component virtually any pair of co-extrudable polymers can be processed into bi- or multi-component fibres by use of one of the sequences described in the foregoing.

A separating component having wide-spread use is a paste consisting of kaolin powder dispersed in a thermostable fluid such as thermostable mineral oil. The kaolin should be surface-treated for the dispersion. However, as such a paste (clay) exhibits high resistance to compressive flow it requires pumping means in the orifice channel immediately before the extrusion into the collecting chamber.

DESCRIPTIONS OF THE PREFERRED EMBODIMENTS

Figure 1:
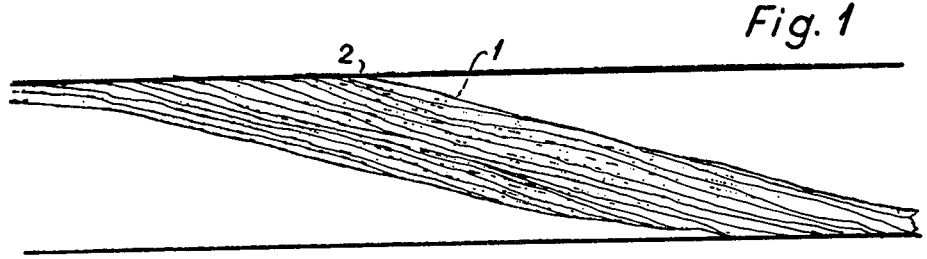
FIG. 1 is a section through the extruded sheet material transverse to the continuous dimension of the lamellae (or the continuous dimension of the rows of chopped lamellae), showing lamellae of flattened S-form.
Figure 2:
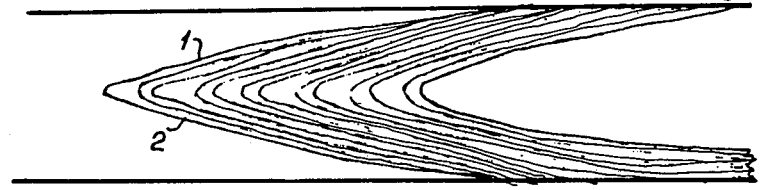
FIG. 2 is a similar section showing U-formed lamellae.
Figure 3:
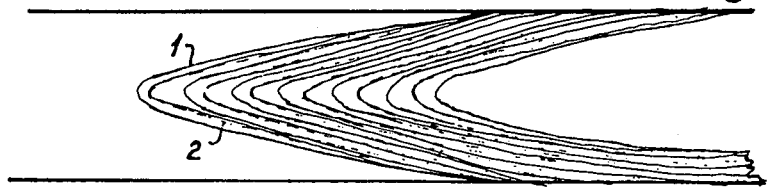
FIG. 3 is a similar section showing the J-form of the reinforcing lamellae, resulting when the U is split already in connection with the extrusion of the lamellae, the sheet being shown before the actual cleavage.
Figure 5:
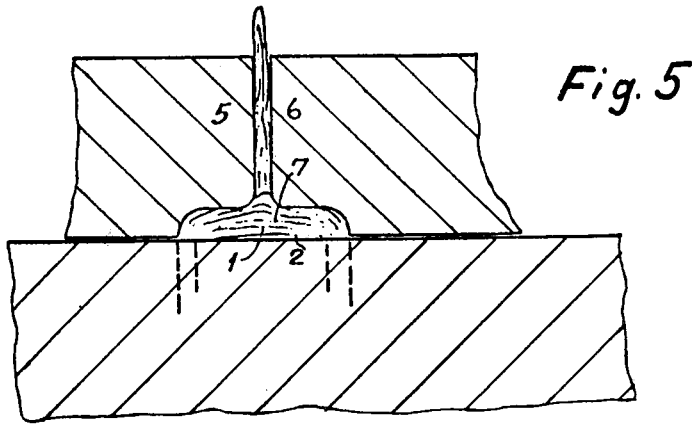
FIG. 5 is a diagrammatic section transverse to the collecting chamber shown in FIG. 3, showing, however, a collection chamber suitable for obtaining the U-form and further showing how lamellae are dragged into this form.

In FIGS. 1, 2, and 3, the film material is shown, for simplicity, as being made of solely two materials, 1 being the reinforcing material and 2 being the filling material. For clarity, the lamellae are represented by lines, but in actual fact they have of course a thickness corresponding to the spacing of the full and dotted lines. Their thickness and the angles to the plane of the sheet are grossly exaggerated, as in fact the overall angle between the lamellae and the dimension of the sheet is below 2°, and the thickness of the reinforcing lamellae is in the range between 0.1 and 10 microns. In FIG. 3 it is further shown that material 1 is absent in a layer in the core of the sheet, whereas material 2 is present all over.

Figure 4:
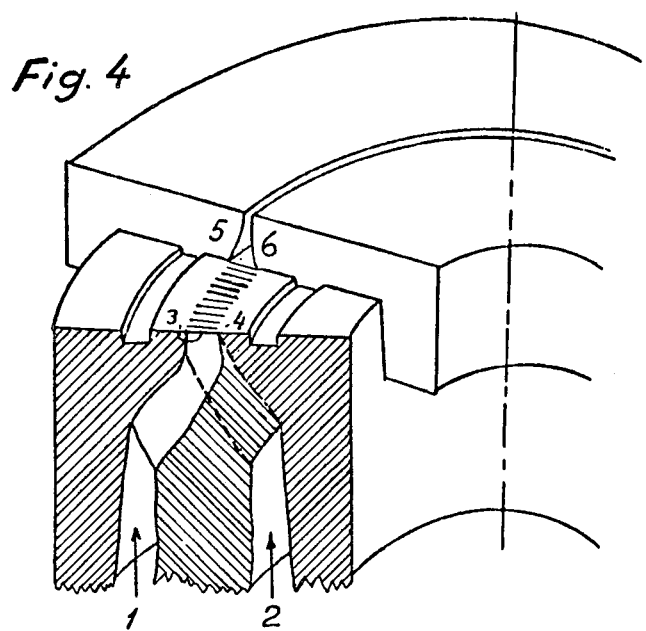
FIG. 4 is a diagrammatic perspective view, partly in section, of a ring die comprising a circular row of extrusion slots, and a collecting chamber ending with a slot for haul-off of the sheet, the device being on principle adaptable to any of the forms shown in FIGS. 1, 2 and 3, but the figure showing slots for either S- or U-form and showing a collecting chamber mainly for the S-form.

The apparatus shown in FIG. 4 comprises a row of slots, three for the reinforcement material and four for the filling material, above which is a collecting chamber consisting of parts 5 and 6 which narrow down to an extrusion slot. The two parts of the collecting chamber may be rotated together relative to the row of slots so that the drag exerted by the bottom of the collecting chamber on the lamellae 1 and 2 as they are extruded from slots 5 and 6 causes the lamellae to be laid substantially flat along the row. Simultaneously, however, the lamellae are forced upwards by fresh polymeric material being extruded through the slots and as they are forced upwards their sides drag against the sides of the collecting chamber, as indicated in FIG. 4, and in particular against the neck 7 (not shown in FIG. 4), and the U-form of FIG. 2 results.

Figure 6:
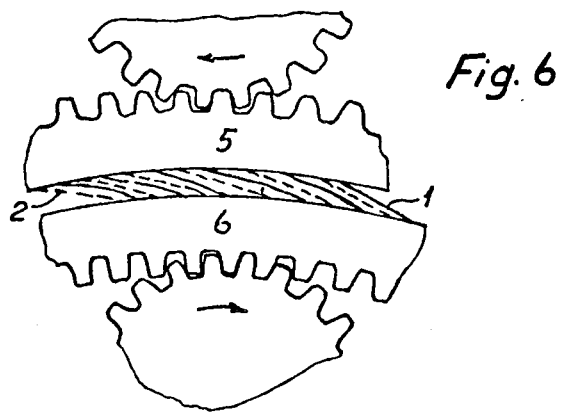
FIG. 6 is a diagrammatic view from above of an apparatus as in FIG. 4, showing the drive and the emerging S-structure.

However, as shown in FIG. 6, the two parts 5 and 6 of the collecting chamber may also be moved in opposite directions to exert a symmetrical drag on the two sides of the lamellae, whereby the S-form is produced. For this purpose, the reduction of thickness within the collecting chamber ought to take place less rapidly, and it is even possible to carry out the process without said reduction.

Furthermore it is shown that this zone of shear (chamber parts 6 and 7) follows immediately after the row of slots. This too is a preferable, but with respect to the S-form not very essential feature, as in fact it is possible to obtain good results when the two sets of lamellae are extruded even into a relatively long chamber where no transversal shear is applied, from there advancing into the zone of shear (parts 5 and 6).

As is easily seen, mixed forms between the S and the U can also be produced by suitably selecting the relative and absolute speeds of the two parts 5 and 6.

Figures 7, 8, 9:
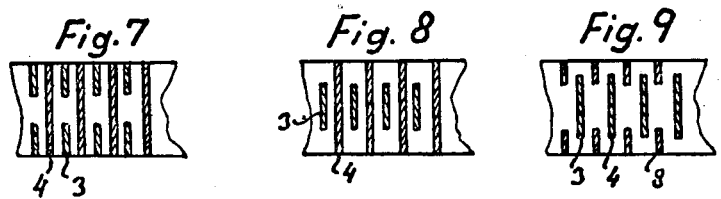
FIG. 7 is a representation of the slot arrangement for producing the structure of FIG. 3.
FIG. 8 is a representation of the slot arrangement for producing on both sides of the sheet a surface skin entirely consisting of the filling material.
FIG. 9 is a representation of the slot arrangement for producing a skin of a third material on both sides of a sheet consisting of crystalline, oriented lamellae and flexible filling lamellae.

In FIG. 7, the slots for material 1 are split so that material 2 from slots 4 will be smeared in between the two half-parts of the lamellae of 1. This arrangement is preferably used in connection with the process for making the U-form of the lamellae, which will, however, in this case turn out in the split form, shown in FIG. 3, (the J form). It is not essential that the orifice parts 3 lie adjacent to each other in the form of a split slot. In fact they can be orifices dislocated from one another.

In similar manner the arrangement of FIG. 8 will produce on both sides of the sheet a skin solely consisting of material 2, extruded through slots 4, whereas in FIG. 9 a skin is produced from the material extruded through orifices 8.

In the following examples, the indications of melt indexes refer to ASTM D 1238 - 62T.

In each of the examples the S form lamellae are produced by use of the apparatus shown in FIGS. 4 and 6.

Figure 10:
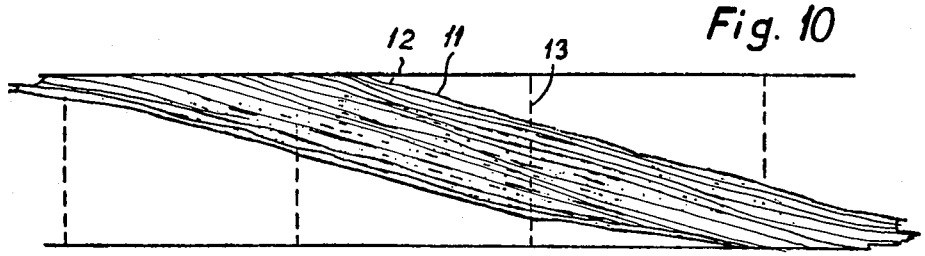
FIG. 10 is a section through sheet material capable of being disrupted according to the invention and having lamellae of a flattened S-form, the section being transverse to the continuous dimension of the lamellae, normally but not necessarily being the direction of extrusion. The splitting of each of the lamellae is also indicated.

In FIG. 10 as well as the other figures the sheet material is shown, for simplicity, as being made of solely two materials, 11 being the first polymeric material and 12 being the second material. For clarity, the lamellae are represented by lines, but in actual fact they have of course a thickness corresponding to the spacing of the full and dotted lines. Their thickness and their angles to the plane of the sheet are grossly exaggerated. Normally the overall thickness will be about or below 10 microns and may even be below 1 micron, and the overall angle to the plane of the sheet will normally be about or below 1°. FIG. 10 further shows how each lamella of material 11 can be split through lines 13, either by cutting or tearing with needles, or by subdividing in fluid state, or by any of the mechanical methods known for splitting an oriented film.

In this splitting is carried out before any substantial cleaving of the lamellae structure has taken place, the result will normally be split-planes which traverse the sheet from surface to surface as shown (although not necessarily with the indicated regularity) hereby crossing the planes of cleavage. If the material is first cleaved, however, the splitting will often be more irregular.

Figure 11:
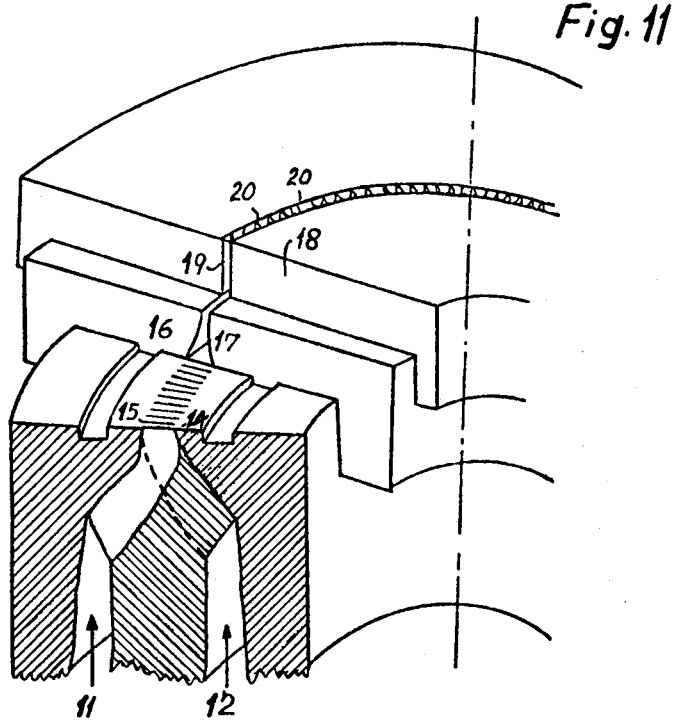
FIG. 11 is a diagrammatic perspective view, partly in section, of a ring die comprising a circular row of extrusion slots, a collecting chamber the two sides of which are rotated relative to each other (normally both are rotated in opposite directions) and a slot part, normally steady, supplied with dividing walls in a grid-like arrangement to split the lamellae in fluid state, FIG. 12 in partly sectional view on principle and in large magnification shows the sandwich-like melted product as it passes through the extrusion device and is being subdivided into strips, FIGS. 13, 14, and 15 in perspective view and in large magnification show three different forms of the morphology of the strip produced by the present invention, FIG. 16 in partly sectional view shows the first part of a mechanically driven extrusion device to carry out the present invention, this part making the sandwich-like arrangement by smearing-out action.

The apparatus shown in FIG. 11 comprises a circular row of slots 14 and 15 for extrusion of materials 11 and 12, respectively, into the collecting chamber consisting of parts 16 and 17, which are rotated relative to each other, as indicated in FIG. 6.

The collecting chamber is shown as being defined by the walls of the mutually movable parts 16 and 17 which narrow down smoothly. This narrowing down seems to be preferable with respect to the regularity of the structure obtained, however, it is not very essential. Furthermore, this zone of shear (chamber parts 16 and 17) is shown as following immediately after the row of slots. This too is a preferable, but not very essential feature, as in fact it is possible to obtain good results when the two sets of lamellae are extruded even into a relatively long chamber where no transversal shear is applied from there advancing into the zone of shear (parts 16 and 17).

In the slot part 18 the slot 19 is interrupted by dividing walls 20 forming a kind of grid which splits the fluid sheet-formed material to ribbons, strips or filaments, hereby splitting each of the lamellae. If the material is to be extruded in sheet form, the part 18 is removed. Extremely fine deniers of the individual lamellae can be obtained by such splitting carried out in connection with the haul-off. If the row of slots 14 and 15 and the slot part 18 are stationary in relation to each other, the lamellae will generally remain continuous after said splitting, whereas if the two parts are rotated relative to one another, the lamellae will generally be chopped to staples, but remain in adhesive connection till the cleaving process is carried out. The most practical arrangement of such relative rotation is to keep part 18 stationary in order to avoid a rotation of the haul-off devices with respect to the axis of the extrusion device whereas the row of slots 14 and 15 is rotated. Consequently, polymers 11 and 12 must be extruded into the main channels which feed 14 and 15 through revolving fittings or the like.

The shape of the lamellae will depend at least in part upon the proportion between the viscosities of the particular extrudable materials used, as well as their deviation from Newtonian behavior, and upon the movements and shape of the devices establishing the shear. Generally, the materials should have rather similar viscosities, but the use of different viscosities is facilitated by making a sudden reduction of the flow area of the extrusion nozzle at the orifices, so that a substantial pressure drop is produced within these orifices.

In case the extrusion takes place at the same speed at different portions of the cross-section of each of the orifices 14 and 15, the parts 16 and 17 preferably ought to rotate at the same speeds but in opposite directions. In practice, however, there will normally be differences between the extrusion velocities over the cross-section of each of the orifices, and this in combination with the fact that the viscosities of the materials are unequal tends to produce different dragging at the two surfaces.

In order to compensate for such differences the parts 16 and 17 should normally not move exactly at numerically equal speeds (as seen in relation to the row of orifices which may be stationary or may move), but the speeds should preferably be suitably adjusted to make the structure as regular as possible. However this is not an essential feature of the invention, and in fact it is possible even to rotate parts 18 and 19 in the same direction (as seen in relation to the row of slots) but at different speeds. This will normally produce a wide range of fibre thickness, which may under certain circumstances be aimed at.

It is within the scope of the invention to make the row of slots 14 and 15 either in the wall of 16 or in the wall of 17. in these cases again, there will normally be produced a wide range of fibre thicknesses.

Within the scope of the invention the first material may be any extrudable thermoplastic polymeric material suitable for producing fibrous materials, either of a fully synthetic or a semi-synthetic type, and furthermore the invention can be applied to prepolymers, such as polyisocyanate/polyol—compositions. Curing of the prepolymers should preferably be carried out before the cleaving. As for the second material, this may even be a non-polymeric material, in this case generally a paste of suitable viscosity.

Figure 12:
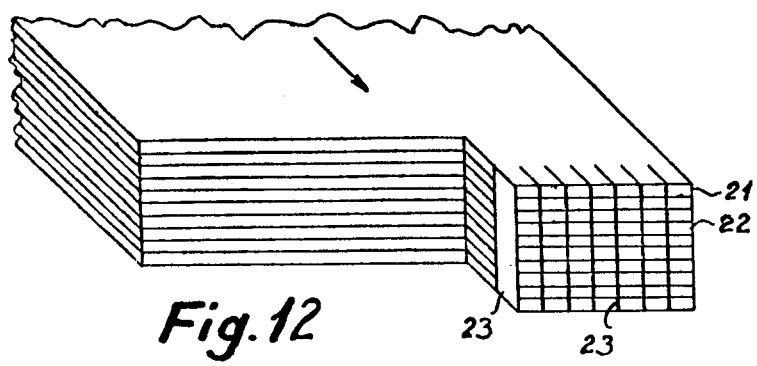
Figure 21:
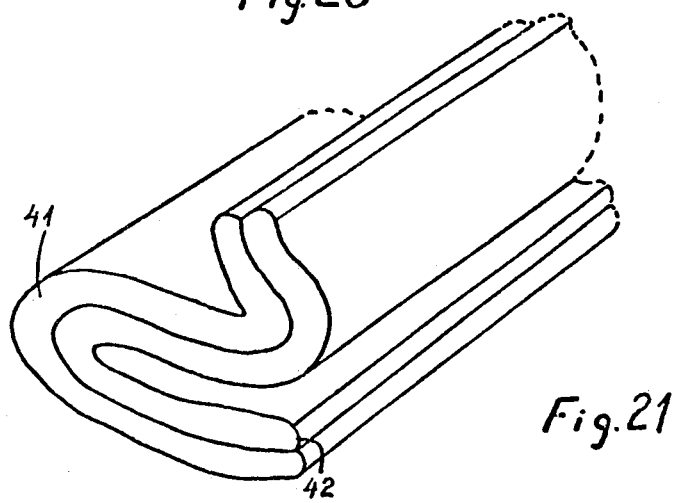
FIG. 21 shows a perspective view of a bi-component bulked fibre according to the invention.
Figure 22:
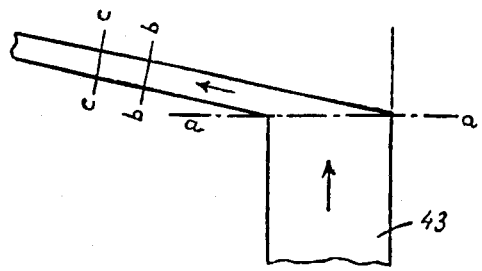
FIG. 22 is a schematic illustration of a stretching bench suitable for orienting and compressing a sandwich-like product by the method according to the invention.

In FIG. 12, 21 and 22 represent two different materials in sandwich-arrangement at the stage when the composite product is extruded through a chamber in sheet form and is subdivided to form many strips, in which the sandwich-structure will lie transversely. The blades 23 to produce the subdivision are shown, while the other apparatus parts are omitted. If instead of blades, wedges widening in the direction of flow are used, tapering chambers will be formed between the wedges, and the fluid product will therefore be compressed in the lateral direction of the sheet during the subdividing step.

Figures 13, 14, 15:
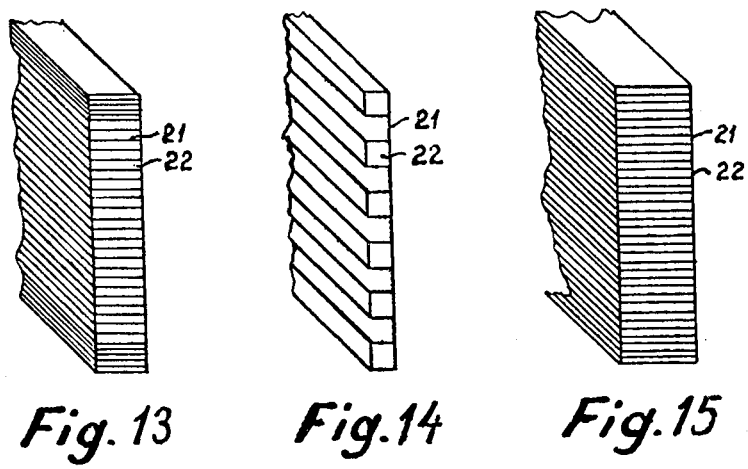

FIG. 13 shows a morphology where the layers themselves are strips with their flat dimension transversal in relation to the flat dimension of the extruded laminated strip, whereas each layer in FIG. 14 tends to be a strip with its flat dimension parallel to the flat dimensions of the extruded laminated strip. Whether the structure of FIG. 13 or that of FIG. 14 is formed depends on the number and relative thickness of layers in the sandwich, the dimensions of the extrusion devices, and the drawdown ratio after extrusion. In FIG. 13 the layers are shown thinner near the edges than at the middle. Such differences will generally occur when the layers are formed by smearing action as described.

FIG. 15 shows the morphology resulting when a grid has been inserted in the extrusion device to subdivide the layers before the fluid product reaches the subdividing means, which in this case should be of the wedge type so as to compress the strips in the dimension which originally was the lateral dimension of the sheet. In the case shown, three rows of lamella-formed layers are formed, corresponding to four blades or wires per strip-forming chamber. This can for instance correspond to a grid division of one millimeter and a chamber division of 4 millimeters. If furthermore, the width of each of the slots at the end of the chambers is one millimeter, the width of each small lamella will be ⅓ millimeter at the time when it leaves the extrusion device. If by drawing-down, partly in melted and partly in solid state, the thickness of each laminated strip is brought down to for instance 0.03 millimeter, the width of each of the small lamellae will beocme 0.01 millimeter. The thickness of each lamella can be essentially smaller.

Figure 16:
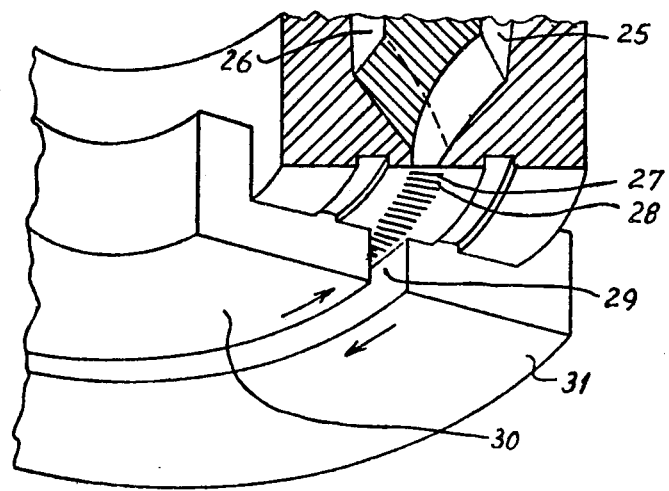

The extruder head shown in FIG. 16 comprises two ducts 25 and 26 communicating with extrusion slots 27 and 28, respectively. An extrusion chamber 29 comprising two parts 30 and 31 which can be rotated around a common axis in opposite directions is located along the length of the circular row of extrusion slots. The radially arranged lamellae produced by the slots 27 and 28 are subjected to a smearing action during the passage between the oppositely rotating walls of the chamber 28. This smearing action causes the lamellae to be drawn out to form a sa dwich-like arrangement in which the layers will traverse the thickness of the sheet, but under a very small angle. The layers thus formed may be divided into very narrow ribbons by means of a row of radial wires or thin blades provided in the path of the extruded tube (not shown in FIG. 16) and is finally formed to ribbons in the manner previously described.

Figure 17:
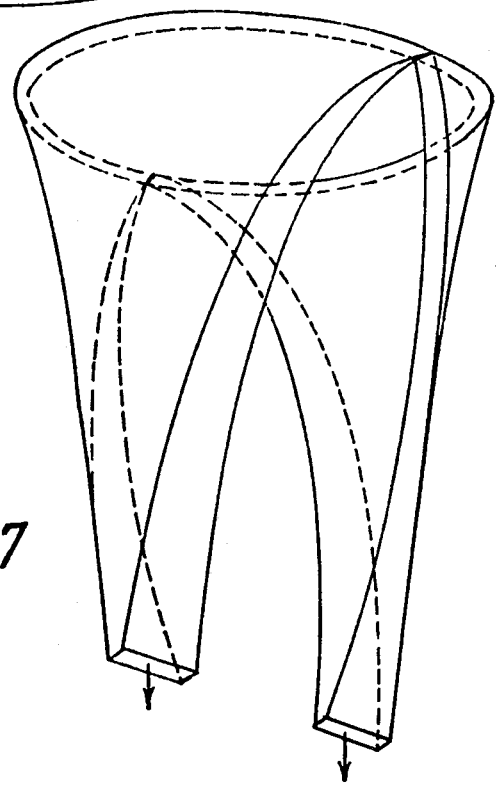
FIG. 17 is a schematic illustration in perspective view of a method of inverting the position of the sandwich layers by passage through a zone in an extruder head which gradually changes the dimension of thickness into width and vice versa.

FIG. 17 illustrates a method of inverting the position of the sandwich structure by passage through two chambers, which gradually change the dimensions of the cross section. For the sake of clarity, the figure only shows the shape of the melted material inside the chambers instead of showing the chamber per se. One end of each chamber, which is to be mounted in direct communication with the device shown in FIG. 16, is half-ring-shaped except for a small grid of radial wires (or thin blades) for dividing the layers into narrow strands, if desired. The width of each chamber gradually decreases and its thickness increases from one end of the chamber to the opposite end so that the dimension of width becomes thickness and vice versa.

Figure 18:
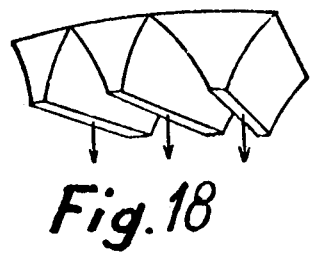
FIG. 18 is a schematical illustration in perspective view of a method of making a similar inversion of the position of the sandwich arrangement by means of a circular row of chambers but without inverting the cross-sectional dimensions of the strips.

FIG. 18 illustrates the material flowing through a circular row of many chambers instead of just the two chambers shown in FIG. 17. Moreover, in the chambers used in FIG. 18 no widening takes place of the dimension which originally was perpendicular to the flat dimension of the sheet. Thus, the extrusion of the strips takes place in a kind of star arrangement. Preferably the extrusion should take place downwards into a quench bath.

Figure 19:
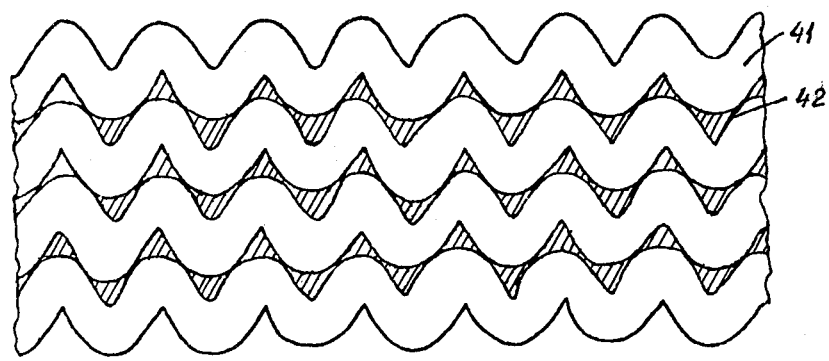
FIG. 19 shows a cross-section, in high magnification of a product prepared by the method according to the invention.

In the fibrous product shown in FIG. 19, 41 defines internally pleated layers of a first polymeric material and 42 defines layers of a second polymeric material laminated with the first polymeric material. The fibrous product shown in FIG. 20 also comprises layers 41 of a first polymeric materal and layers 42 of a second polymeric material. The sandwich-like product shown in FIG. 20 has been divided in fluid state to narrow ribbons before being compressed.

Figure 20:
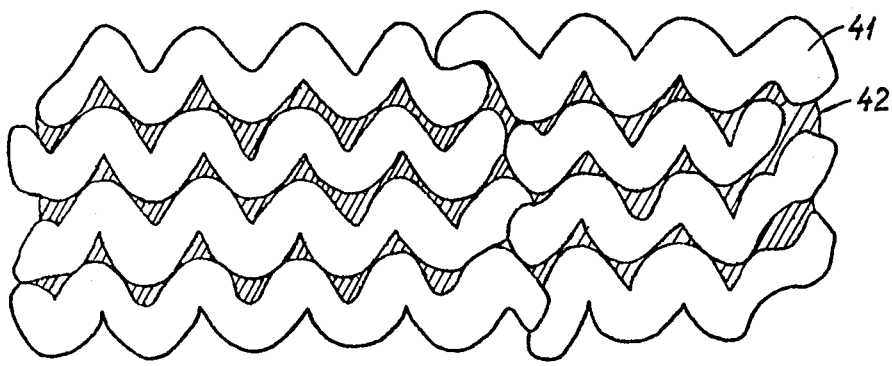
FIG. 20 shows a similar view of another product prepared by the method according to the invention.

The bi-component bulked fibre shown in FIG. 21—formed by disruption of the product of FIG. 19 or 20—comprises a pleated layer 41 of a first polymeric material and another pleated layer 42 of a second polymeric material.

The stretching device shown in FIG. 22 comprises a first set of rubber-coated nip-rollers, the nip zone of which is indicated by the line a-a. It also comprises a second and a third set of nip-rollers, the nip zones of which being indicated by the lines b-b and c-c, respectively. A sandwich-like product 43 in ribbon form is fed into the nip zone of the first set of nip-rollers in a direction perpendicular to the axis of the rollers and is drawn off by the second set of rollers in a direction almost perpendicular to the feeding direction. Simultaneously with said change of direction the ribbon is strongly stretched in its longitudinal direction, the peripheral speed of the second set of rollers being chosen several times higher than that of the first set of rollers. Owing to said strong longitudinal drawing in combination with the extra narrowing resulting from the change of direction, a tension is produced which is capable of imparting to the ribbon relatively fine external longitudinal pleats which pleats are converted to internal pleating, when the ribbons subsequently pass the second set of rollers. In order to obtain said pleating the ribbon should not be too thin and generally not below 100 microns during the feeding into the device. The third set of nip-rollers driven so as to produce a small further elongation serves to maintain a high longitudinal tension in the ribbon during the full passage between the second set of rollers. The device shown preferably also comprises a hot-air oven (not shown) located immediately before the first set of rollers, heating elements provided within said first set of rollers and a second hot-air even located between the zone a-a and b-b. The device may also comprise a cooling device located between the zone b-b and c-c.

If the change of direction is $\alpha$, the ratio of reduction of width will be sin $(90° - \alpha)$. The sandwich-like product stretched at a ratio n will exhibit a tendency to obtain a reduction of width of a ratio about $1:\sqrt{n}$ as it tends to obtain about equal reductions of width and thickness when it is stretched n times whereas the volume of the product is kept practically constant. Thus, in order to obtain the intended internal pleating, sin $(90° - \alpha)$ must be significantly smaller than $1:\sqrt{n}$. In practice the change of direction should preferably be chosen so that sin $(90° - \alpha)$ will be between $1:2\sqrt{n}$ and $1:3\sqrt{n}$.

Figure 23:
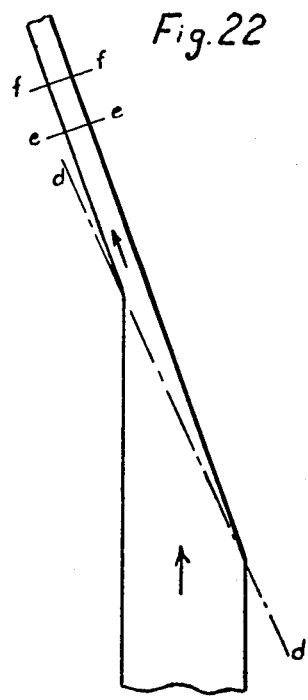
FIG. 23 is a schematic illustration of another stretching bench for use in the method according to the invention.

The ribbon compressed and stretched in the device shown in FIG. 22 is preferably further treated in a device shown in FIG. 23. This device comprises a first set of rollers having a nip zone indicated by the line d-d, a second set of rollers indicated by the line e-e and a third set of nip-rollers indicated by the line f-f. The sheet material to be compressed and expanded is fed into the zone between the first set of nip-rollers under an angle to the nip zone and is drawn off by means of the second set of nip-rollers. In order to enable the feed under an angle, the first set of nip-rollers each consists of sections which are guided to slide in the longitudinal direction of the roller by reciprocative movement synchronized with the rotation, as described in British patent specification No. 1.078.732. During the passage through the device shown in FIG. 23, a previously oriented sheet can become laterally compressed with only a small further longitudinal stretching being necessary. By said treatment, the pleats produced become deeper. Generally, it is not desirable to produce the full depth of said pleats in one stage, and generally it is not desirable to use two devices of the type shown in FIG. 22 arranged in succession. It should be understood that in the arrangement of FIG. 23 like in that of FIG. 22 an external pleating occurs between the first set of rollers d-d and the second set of rollers e-e, whereafter the external pleats are converted to internal pleats by the passage through the rollers e-e.

Figure 24:
FIGS. 24, 25, 26, and 27 are schematic illustrations of various steps during the extrusion of a sandwich-like product by means of the extruder head shown in FIG. 16.
Figure 25:
Figure 26:
Figure 27:

The radially arranged lamellae, of. FIG. 24, e.g. produced by the slots 27 and 28 in FIG. 16, are subjected to a smearing action during the passage between the oppositely rotating walls 30,31 of FIG. 16. This smearing action causes the lamellae to be drawn out so as to get the form shown in FIG. 25. The layers thus formed may be divided into very narrow ribbons by means of a row of radial wires or thin blades provided in the path of the extruded tube, of. FIG. 11. In this case, the product will get the form shown in FIG. 26. If the material thus formed is subjected to a further smearing action although less vigorous than the first smearing treatment it will get the form shown in FIG. 27. The reason for subjecting the material to this further treatment is to make the structure sufficiently coherent in sheet form to be capable of being treated on the stretching devices shown in FIG. 22 and 23. This extruder head can easily be modified to co-extrude three or four materials instead of only two materials.

FIG. 17 illustrates a method of compressing (micropleating) a sheet-like product by passage through two chambers in an extruder head which gradually changes the dimensions of the cross section. The increase of the width, however, is not strictly necessary for obtaining the effect of internal pleating. Furthermore, the grid can be omitted if use is made of a rather great number of relatively small chambers to produce the internal pleating.

Figures 28, 29:
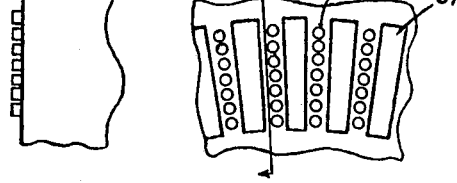
FIG. 28 shows a modification of the extrusion orifices shown in FIG. 16.
FIG. 29 is a cross-sectional view along the line XIII-XIII in FIG. 28.

The extrusion device shown in FIG. 28 comprises extrusion slots 51 and protruding extrusion nozzles 52 which are capable of forming filaments of a polymeric material which will be embedded in a matrix of polymeric material extruded through the slots 51. It is to be understood that the remaining part of the device corresponds to that shown in FIG. 16 and that the filaments are flattened by means of the rotating members 30 and 31 shown in FIG. 16.

In the following Examples 1–5 the sheet materials described were prepared by the S-method, i.e. the method illustrated in FIG. 6.

EXAMPLE 1

Production of a sheet with high contents of an inorganic filler for use as substitute of book-print paper.

First polymeric material: High density polyethylene of melt index 0.2 (ASTM condition E).

Second extrudable material: 50% talc powder + 50% low density polyethylene of melt index 70 (ASTM condition E).

Proportion between reinforcement material and filling material about 1:1.

The sheet material should be biaxially drawn at about 110° C. at a ratio of 1:2 in both directions. Thickness before drawing about 0.1 millimeter.

EXAMPLE 2

Production of a light and stiff expanded sheet for packaging purposes.

First polymeric material: An ethylene/vinyl-acetate copolymer with 5% vinyl-acetate. Melt index 0.3 (ASTM condition E).

Second extrudable material: Expandable polystyrene containing petrol ether as expansion agent. Appearing to have about the same melt viscosity as the polyethylene.

Adhesive component: A mixture between (a) the same polyethylene and (b) a polystyrene with small contents of copolymerized butadiene, melt index 0.5 (same condition).

Ratio between reinforcing material and filling material about 1:1.

The expansion takes place during haul-off. Temperature of the circular slot: 120° C. (but higher temperature at the start of the run).

Blow ratio: About 2:1. Weight of the final sheet: About 50 grams per sq. m. Density of the final sheet: About 0.1 kg. per liter.

The product has in particular a high folding strength.

EXAMPLE 3

Production of a wrapping material consisting of crystalline, oriented lamellae and flexible lamellae.

First polymeric material: The same high density polyethylene as in example 1.

Second extrudable material: The same copolymer of ethylene as in example 2.

Proportion between reinforcing material and filling material: 6:4.

A skin of the filling material is produced on both surfaces.

The sheet is biaxially drawn at about 100° C. at ratios of about 2.5:1 in both directions. It exhibits an improved tear propagation resistance compared to normal biaxially drawn film material.

EXAMPLE 4

Instead of being drawn in balanced manner, the sheet of example 3 is cross-drawn at ratio 1.5:1 and simultaneously length-drawn at ratio 3:1 to about 100° C. The drawing can take place by means of a tenter frame. Another unoriented sheet of example 3 is cross-drawn at ratio 3:1 and simultaneously length-drawn at ratio 1.5:1.

The two plies are laminated between nip-rollers, the temperature of the rollers being kept at 80° C. and vapors of toluene being applied to condense into the nip on the sheet surface in order to bind the plies together.

The product exhibits improved tear propagation strength compared to a normal cross-laminate.

EXAMPLE 5

Production of a textile web.

First polymeric material: Polycaprolactame of melt index 2.2 (ASTM condition K) blended with polyethylene of melt index 7 (ASTM condition E) in a planetary extruder. Ratio of polyamide to polyethylene: 75:25.

Second extrudable material: The same components but ratio of polyamide to polyethylene: 55:45.

The shear action should be adjusted to produce layers of an overall thickness of about 2 microns to equal the average diameter of the crystal "whiskers" formed on crystallization of such molten polymer in polymer mixtures when the latter are in drawn state during crystallization.

Blow ratio: 1:1.

Cooling during haul-off: Strictly controlled air cooling, hot air being used to keep the temperature of the sheet beyond 160° C. till all the polyamide is crystallized. This temperature control has the purpose of promoting the "growth of the whiskers".

The extruded sheet, having a thickness of about 70 microns should be passed through a bath of mineral oil for about 10 seconds and in immediate succession hereto cross-drawn by means of a tenter frame, while keeping the temperature at 170° C. and allowing a lengthwise contraction. Finally, the oil should be leached.

The product will be very suitable for many sanitary purposes, and after cross-lamination of two plies of the material, the resultant product will be suitable for disposable apparel. The uniting of the plies can be carried out by application of an elastomeric gluestuff in spots.

EXAMPLE 6

Polycaprolactame of a melt index of 3 (ASTM D 1238-57 condition K) and polyethylene of the same melt index under said condition is extruded in a proportion of 40:60 by means of the devices shown in FIGS. 16 and 17. Between the two devices is a grid (not shown) as mentioned in the description of FIG. 16. The length of slots 27 and 28 is 6 millimeters and the chamber 29 has a constant radial width of 6 millimeters, too.

The inlet width of each of the chambers for inversion of the structure is 5 millimeters, the outlet width being 1 millimeter. The products thus formed is then oriented at 165° C. at a draw ratio of 2.5:1. The structure is disrupted to splitfibre networks by flexing and rubbing.

EXAMPLE 7

Polypropylene toughened by block copolymerization with elastomeric segments of ethylene/propylene and having a melt index of 0.3 (ASTM D 1238-57, condition L), and a copolymer of 71% ethylene and 29% vinylacetate having a melt index of 5 (ASTM D 1238-57, condition E) in a ratio of 65:35 are extruded in the extruder head shown in FIG. 16 which, however, is provided with a row of twenty compression chambers, each on principle shown in FIG. 17. The length of slots 27 and 28 is 6 millimeters and the chamber 29 has a constant radial width of 6 millimeters. The inlet width of each of the chambers for internal pleating is 20 millimeters, the outlet cross-sectional dimensions of the chambers are 12 millimeters×2 millimeters. The extruded product is oriented at 120° C. and at a draw ratio of 1:5. It is then swelled with chloroform and subsequently caused to expand by passage through boiling water. Finally, the material is split to individual filaments by rubbing between rubber plates.

EXAMPLE 8

Polycaprolactame of a melt index of 3 (ASTM D 1238-57, condition K) and polyethylene (melt index 7, condition E) are extruded in a proportion of 40:60 by the method described in example 7. The product thus formed is then oriented at 165° C. at a draw ratio of 2.5:1. The structure is disrupted to spitfibre network by flexing and rubbing.

In the following examples, the melt indices refer to ASTM D 1238-62 T. The conditions are indicated in each case.

EXAMPLE 9

Objective: To produce a three-layer fibre consisting of two incompatible polymers united by a binding layer and to obtain cleaving at the interfaces between the incompatible polymers.

Composition:

Component I (50%): Nylon 6.

Component II (5%) (adhesive): Copolymer of ethylene and Zn-acrylate, trade name Surlyn Z.

Component III (45%): Polypropylene.

Sequence of coextrusion: . . . I, II, III, I, II, III, . . .

The product tends to cleave at the interfaces between III and I.

Extrusion die: A device as shown in FIG. 16 for simultaneous extrusion of 80 tapes each of inverted layer structure, but constructed for three instead of two components, i.e. fed from three extruders and having three annular manifold chambers. The product was extruded downwards into a water bath.

Melt indices according to condition L: I and III: 2.2, II: 3.5.

Temperature at die outlet: 260° C.

Further extrusion conditions: Throughput was 25 kg per hour, and the movable die-parts counterrotated at equal velocities. This rotation and the velocity of haul-off was adapted to yield a typical fibre thickness of 20 microns for the final composite fibre and a yarn denier of 900 per tape before crimping.

Further processing of the tape: Stretched at ratio about 3:1 at elevated temperature, cleaved by frictional work in six steps by the method described in U.S. Pat. No. 3,427,654, texturized by shrinkage in boiling water and dried.

Final Product: A multi-filament yarn of crimped flat filaments suitable e.g. for carpet facing.

Examination under microscope: A cross-section of the extruded unoriented tape, fixed in a specimen clamp, shows the "inverted" layer structure represented by FIG. 13. When the specimen is slightly rubbed in the clamp the incompatible components separate at the interfaces while the adhesive bondings are maintained.

EXAMPLE 10

Objective: See example 9.
Composition:
Component I (50%): Polyethyleneterephthalat.
Component II (5%) (adhesive): A homogeneous blend of (A) 50% polyethyleneterephthalat copolymerized with blocks of polyethyleneglycol, and (B) 50% copolymerized Nylon 6 and Nylon 66 (socalled Nylon 6 A).
Component III (45%): Nylon 6.
Sequence of coextrusion: See example 9.
Extrusion die: See example 9.
Melt indices according to condition K: I and III: 12, II:17.
Temperature at the die outlet: 275° C.
Further extrusion conditions: See example 9, but adapted to yield a typical fibre thickness of 10 microns and a yarn denier of 1.200 per tape before crimping.
Further processing of the tape and examination under microscope: See example 9.
Final product: Due to the thinner fibres, the yarn is suitable for apparel, e.g. for handknitting.

EXAMPLE 11

Objective: To illustrate the production of a four-layer fibre consisting of two incompatible polymers united by a system of two adhesive layers and to make a cheap polyester fiber by combination with polyethylene.
Composition:
Component I (40%): Polyethyleneterephthalat.
Component II (5%) (adhesive component): Polyethyleneterephthalat copolymerized with blocks of polyethyleneglycol.
Component III (5%) (adhesive component): Copolymer of ethylene and Zn-acrylate (trade name Surlyn Z).
Component IV (50%): Low density polyethylene.
Sequence of coextrusion: . . . I, II, III, IV, I, II, III, IV, . . . The product tends to cleave at the interfaces between IV and I.
Extrusion die: See example 9 but modified to a four component system.
Melt indices according to condition K: I and IV: 12, II: 20, III: 15.
Temperature at die outlet: 275° C.
Further extrusion conditions, further processing of the tape, and examination under microscope: See example 9, but the texturizing is carried out by dry heating.
Final product: See example 10.

EXAMPLE 12

Objective: To demonstrate the production of two-layer fibres consisting of components which can bond directly to each other, while using a third polymer as separating component, the separating component being incompatible with the other polymers and forming one-layer fibres by cleaving at the interfaces.
Composition:
Component I (35%): Nylon 6.
Component II (35%): Nylon 12.
Component III (30%) (separating component): Polycarbonate (trade name: Lexan).
Sequence of coextrusion: . . . I, II, III, I, II, III, . . .
The product tends to cleave at the interfaces II-III and III-I.
Extrusion die: See example 9.
Melt indices according to condition K: All components about 7.
Temperature at die outlet: 260° C.
Further extrusion conditions, further processing of the tape and examination under microscope: See example 9.
Final product: See example 10.

EXAMPLE 13

Objective: See example 12.
Composition:
Component I (35%): Copolymer of 85% vinylidenechloride and 15% polyvinylchloride (Saran).
Component II (35%): Polyvinylchloride (without plasticizer).
Component III (30%) (separating component): Low density polyethylene.
Sequence of coextrusion: See example 12.
Extrusion die: See example 9.
Melt indices according to condition E: All components about 1.0.
Temperature at die outlet: About 200° C.
Further extrusion conditions, further processing of the tape and examination under microscope: See example 9, but the texturizing is carried out by dry heating.
Final product: See example 10.

EXAMPLE 14

Objective: To produce three-layer fibres consisting of a strong hydrophobic middle layer and a lower-melting and more hydrophilic component on both sides and to demonstrate the use of a separating component which is fully or partially removed.
Composition:
Component I (70%): A blend of 85% polypropylene and 15% polyethylene (both homopolymers).
Component II (25%): Copolymer of ethylene and acrylic acid.
Component III (5%) (separating component): Polyethyleneoxide.
Sequence of coextrusion: . . . II, I, II, III, II, I, II, III, . . . The cleaving tends to take place in III by leaching of said component.
Extrusion die: See example 9, but the manifold system modified to the said system.
Melt indices according to condition L: All components about 4.

Temperature at die outlet: About 230° C.

Further extrusion conditions: See example 9, but adapted to yield a typical fibre thickness of 5 microns and a yarn denier of 900 per tape.

Further processing of the tape: Stretched at ratio 6:1, cleaved by frictional work (see example 9), cut into short lengths and dispersed in water, whereby the separating component is partly leached and further cleaving occurs.

Final product: Fibres suitable in cellulose paper masses as reinforcing and binding elements. The surface layers can be fused to cellulose fibres without substantial loss of the orientation in the middle layer.

EXAMPLE 15

Objective: To show the simultaneous production of two different two-layer fibres.

Composition:

Component I (25%): Nylon 6.

Component II (25%): Nylon 66.

Component III (25%): A blend of 75% polypropylene and 25% polyethylene (both homopolymers).

Component IV (25%): A blend of 75% polyethylene and 25% polypropylene (both homopolymers).

Sequence of coextrusion: . . . I, II, III, IV, I, II, III, IV, . . . The product tends to cleave at the interfaces between II-III and IV-I.

Extrusion die: Same as in Example 11.

Melt indices according to condition K: 7 for all components.

Further extrusion conditions, further processing of the extruded tape, final pruduct, and examination under microscope: See example 9.

I claim:

1. A method of producing fibrous products, including single fibers, yarn and fibrous webs, of improved fineness from extruded sheet material which comprises the steps of extruding in the form of a sheet-like, multi-layer composite stream a plurality of extrudable materials, at least one of which is a synthetic thermoplastic fiber-forming polymer and another of which is expandable or swellable, said layers extending generally parallel to the faces of said stream, some of such layers containing said fiber-forming polymer and others said expandable or swellable extrudable material with the different layers being interspersed in said composite stream, solidifying said composite stream into a multi-layer sheet, subjecting the multi-layer sheet not earlier than during such solidification to a swelling or expanding treatment to aid in its mechanical disruption, and then mechanically disrupting the swollen or expanded sheet to produce a fibrous product of increased fineness.

2. The method of claim 1, wherein said solidified sheet is subjected to orientation before said swelling or expanding treatment.

3. The method of claim 1, wherein layers are extruded of at least two different synthetic thermoplastic fiber-forming polymers which intimately adhere together in the solid state, said different polymeric layers being arranged in groups of at least two such layers with the groups being separated by a layer of said expandable or swellable material.

4. The method of claim 3, wherein said groups of two such layers include at least one intermediate layer of a third mutually adhesive synthetic polymer.

5. The method of claim 1, wherein said multi-layer composite stream is divided along spaced apart generally parallel planes extending through said sheet at an angle to the sheet faces, said divided streams are merged again with the layers thereof generally intact into sheet form which is then solidified.

6. A method of producing fibrous products, including single fibers, yarn and fibrous webs, of improved fineness from extruded sheet material which comprises the steps of extruding in the form of a sheet-like, multi-layer composite stream a plurality of extrudable materials, at least one of which is a synthetic thermoplastic fiber-forming polymer and another of which is substantially incompatible with said polymer, said layers extending generally parallel to the faces of said stream, some of said layers containing said fiber-forming polymer and others containing said incompatible material with the different layers being interspersed in said composite stream with at least one surface of a polymer containing layer in direct face-to-face contact with one surface of a layer containing said incompatible material, solidifying said composite stream into a multi-layer sheet, and then mechanically disrupting the solidifed sheet to produce a fibrous product of increased fineness.

7. The method of claim 6, wherein said solidifed sheet is subjected to orientation before said disrupting treatment.

8. The method of claim 6, wherein layers are extruded of at least two different synthetic thermoplastic fiber-forming polymers which intimately adhere together in the solid state, said different polymeric layers being arranged in groups of at least two such layers with the groups being separated by a layer of said incompatible material.

9. The method of claim 8, wherein said groups of two such layers include at least one intermediate layer of a third mutually adhesive synthetic polymer.

10. The method of claim 6, wherein said multi-layer composite stream is divided along spaced apart generally parallel planes extending through said sheet at an angle to the sheet faces, said divided streams are merged again with the layers thereof generally intact into sheet form which is then solidified.

11. The method of claim 1 wherein before solidification, said multi-layer composite stream is divided along spaced apart generally parallel planes extending through the stream at an angle to the faces thereof, and the thus-divided stream is then solidified.

12. The method of claim 11 wherein the divided stream is subjected to orientation after solidification but before said treatment.

13. The method of claim 6 wherein before solidification, said multi-layer composite stream is divided along spaced apart generally parallel planes extending through the stream at an angle to the faces thereof, and the thus-divided stream is then solidified.

14. The method of claim 13 wherein the divided stream is subjected to orientation after solidification but before said treatment.

* * * * *